United States Patent
Sun et al.

(10) Patent No.: US 11,421,303 B2
(45) Date of Patent: Aug. 23, 2022

(54) TITANIUM ALLOY PRODUCTS AND METHODS OF MAKING THE SAME

(71) Applicant: HOWMET AEROSPACE INC., Pittsburgh, PA (US)

(72) Inventors: Fusheng Sun, Canfield, OH (US); Ernest M. Crist, Jr., Transfer, PA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 16/846,800

(22) Filed: Apr. 13, 2020

(65) Prior Publication Data

US 2020/0239983 A1 Jul. 30, 2020

Related U.S. Application Data

(63) Continuation of application No. PCT/US2018/056953, filed on Oct. 22, 2018.

(60) Provisional application No. 62/575,896, filed on Oct. 23, 2017.

(51) Int. Cl.
*C22C 14/00* (2006.01)
*B33Y 70/00* (2020.01)
*C22F 1/18* (2006.01)

(52) U.S. Cl.
CPC .............. *C22C 14/00* (2013.01); *B33Y 70/00* (2014.12); *C22F 1/183* (2013.01)

(58) Field of Classification Search
None
See application file for complete search history.

(56) References Cited

U.S. PATENT DOCUMENTS

| | | | |
|---|---|---|---|
| 2,893,864 A | 7/1959 | Harris et al. | |
| 3,619,184 A | 11/1971 | Bomberger, Jr. et al. | |
| 4,087,292 A | 5/1978 | Neal et al. | |
| 4,738,822 A | 4/1988 | Bania | |
| 4,770,726 A | 9/1988 | Neal et al. | |
| 4,906,436 A | 3/1990 | Gigliotti, Jr. et al. | |
| 4,980,127 A | 12/1990 | Parris et al. | |
| 5,431,874 A | 7/1995 | Giglioti, Jr. | |
| 5,922,274 A | 7/1999 | Suzuki et al. | |

(Continued)

FOREIGN PATENT DOCUMENTS

| | | | |
|---|---|---|---|
| CN | 105108339 | | 12/2015 |
| CN | 106801164 A | * | 6/2017 |

(Continued)

OTHER PUBLICATIONS

English language machine translation of CN-106801164-A to Zhang et al. Generated Sep. 1, 2021. (Year: 2021).*

(Continued)

*Primary Examiner* — Brian D Walck
(74) *Attorney, Agent, or Firm* — Greenberg Traurig, LLP

(57) ABSTRACT

The present disclosure relates to new titanium alloys and methods for making the same. The new titanium alloys generally include 4.75-6.75 wt. % Al, 6.5-8.5 wt. % (Nb+Ta), 1.5-3.5 wt. % Sn, up to 5.0 wt. % Zr, and up to 2.5 wt. % Mo, the balance being titanium, optional incidental elements, and impurities. Due to their composition and methods of manufacture, the new titanium alloys may find use in several applications, such as aerospace and/or automotive applications.

26 Claims, 11 Drawing Sheets

(56) References Cited

U.S. PATENT DOCUMENTS

| | | |
|---|---|---|
| 6,284,071 B1 | 9/2001 | Suzuki et al. |
| 6,436,208 B1 | 8/2002 | Mahapatra et al. |
| 2004/0099350 A1 | 5/2004 | Mantione et al. |
| 2009/0180918 A1 | 7/2009 | Tsai et al. |
| 2013/0209824 A1 | 8/2013 | Sun et al. |
| 2014/0271336 A1 | 9/2014 | Colombo et al. |
| 2015/0192031 A1 | 7/2015 | Sun et al. |
| 2016/0032437 A1 | 2/2016 | Colombo et al. |
| 2017/0067137 A1 | 3/2017 | Kawasaki et al. |
| 2017/0146046 A1 | 5/2017 | Foltz, IV et al. |
| 2017/0306448 A1 | 10/2017 | Lin et al. |
| 2017/0306449 A1 | 10/2017 | Lin et al. |
| 2017/0306450 A1 | 10/2017 | Lin et al. |

FOREIGN PATENT DOCUMENTS

| | | |
|---|---|---|
| GB | 838519 | 6/1960 |
| GB | 883027 | 11/1961 |
| JP | H04-202729 | 7/1992 |
| JP | H11-29844 | 2/1999 |
| JP | 3049767 | 6/2000 |

OTHER PUBLICATIONS

International Search Report and Written Opinion, dated Dec. 12, 2019, from related International Patent App. No. PCT/US2018/056953.

Cordeiro et al., Is there scientific evidence favoring the substitution of commercially pure titanium with titanium alloys for the manufacture of dental implants, *Materials Science and Engineering C71*, pp. 1201-1215, 2017.

Ding, D., et al., "Effects of Si addition on mechanical properties and superelasticity of Ti—7.5Nb—4Mo—2Sn shape memory alloy", *Materials & Design*, vol. 61, pp. 146-149, Sep. 2014.

* cited by examiner

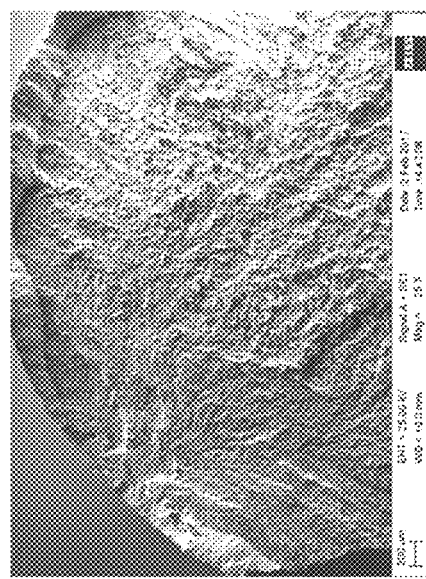
FIG. 4c — Alloy 4 (Non-Inv.)
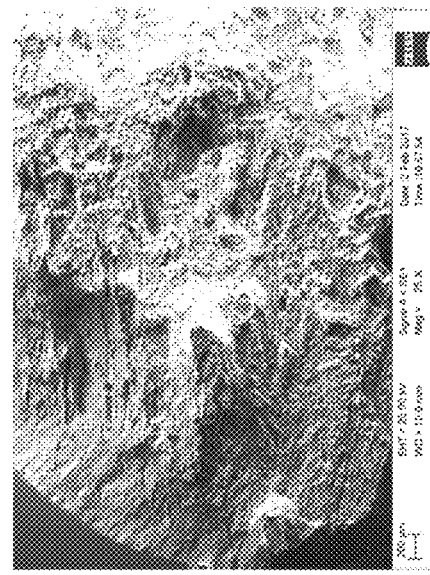
FIG. 4b — Alloy 3 (Non-Inv.)
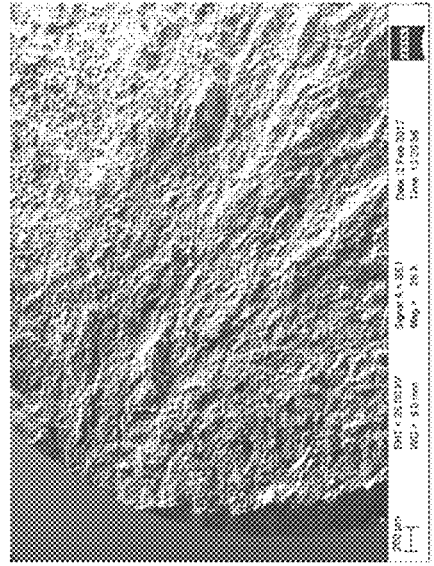
FIG. 4a — Alloy 1 (Inv.)

Alloy 4 (Non-Inv.)

Alloy 3 (Non-Inv.)

Alloy 1 (Inv.)

TITANIUM ALLOY PRODUCTS AND METHODS OF MAKING THE SAME

CROSS-REFERENCE TO RELATED APPLICATIONS

This application is a continuation of International Patent Application No. PCT/US2018/056953, filed Oct. 22, 2018, which claims the benefit of priority of U.S. Patent Application No. 62/575,896, filed Oct. 23, 2017, each of which is incorporated herein by reference in its entirety.

BACKGROUND

Titanium alloys are known for their low density (60% of that of steel) and their high strength. Additionally, titanium alloys may have good corrosion resistance properties.

SUMMARY OF THE DISCLOSURE

Broadly, the present disclosure relates to new titanium alloy products and methods of making the same. The new titanium alloys generally include 4.75-6.75 wt. % Al, 6.5-8.5 wt. % (Nb+Ta), 1.5-3.5 wt. % Sn, up to 5.0 wt. % Zr, and up to 2.5 wt. % Mo, the balance being titanium, optional incidental elements, and impurities. Due to their composition and methods of production, the new titanium alloy products may realize an improved combination of properties, such as, an improved combination of at least two of strength, ductility, creep resistance, dwell fatigue life, low cycle fatigue life, and dwell fatigue life debit. Due to their improved combination of properties, the new titanium alloys may be used in a variety of applications such as aerospace and/or automotive applications, as described in greater detail below.

I. Alloying Elements

As noted above, the present disclosure relates to new titanium alloy products and methods of making the same. The new titanium alloys generally include 4.75-6.75 wt. % Al, 6.5-8.5 wt. % (Nb+Ta), 1.5-3.5 wt. % Sn, up to 5.0 wt. % Zr, and up to 2.5 wt. % Mo, the balance being titanium, optional incidental elements, and impurities.

The new titanium alloys generally include 4.75-6.75 wt. % Al. Aluminum may, for instance, facilitate improved strength and creep resistance. Thus, the new titanium alloys include at least 4.75 wt. % of aluminum. However, too much aluminum (e.g., greater than 6.75 wt. %) may facilitate the formation of the $\alpha_2$-Ti$_3$Al phase that may reduce the ductility of the alloy. In one embodiment, a titanium alloy includes at least 4.9 wt. % Al. In another embodiment, a titanium alloy includes at least 5.1 wt. % Al. In yet another embodiment, a titanium alloy includes at least 5.3 wt. % Al. In another embodiment, a titanium alloy includes at least 5.5 wt. % Al. In one embodiment, a titanium alloy includes not greater than 6.5 wt. % Al. In another embodiment, a titanium alloy includes not greater than 6.3 wt. % Al. In one embodiment, a titanium alloy includes 5.0-6.5 wt. % Al. In one embodiment, a titanium alloy includes 5.3-6.3 wt. % Al.

The new titanium alloys generally include 6.5-8.5 wt. % (Nb+Ta). Niobium and tantalum may, for instance, facilitate improved creep resistance, improved strength, and/or improved dwell fatigue. In this regard, the new titanium alloys include at least 6.5 wt. % (Nb+Ta) to facilitate the improved combination of properties. Niobium and tantalum may stabilize the beta phase (also referred to as the "body-centered cubic phase" and "bcc phase"), and an appropriate amount of beta phase may facilitate improved strength. However, too much niobium and tantalum (e.g., greater than 8.5 wt. % (Nb+Ta)), and therefore too much beta phase may reduce the creep resistance of the alloy. In one embodiment, a titanium alloy includes at least 6.75 wt. % (Nb+Ta). In another embodiment, a titanium alloy includes at least 7.0 wt. % (Nb+Ta). In yet another embodiment, a titanium alloy includes at least 7.25 wt. % (Nb+Ta). In one embodiment, a titanium alloy includes not greater than 8.25 wt. % (Nb+Ta). In another embodiment, a titanium alloy includes not greater than 8.0 wt. % (Nb+Ta). In yet another embodiment, a titanium alloy includes not greater than 7.75 wt. % (Nb+Ta). In another embodiment, a titanium alloy includes not greater than 7.5 wt. % (Nb+Ta). In yet another embodiment, a titanium alloy includes not greater than 7.25 wt. % (Nb+Ta). In one embodiment, a titanium alloy includes 7.25-8.25 wt. % (Nb+Ta). In one embodiment, a titanium alloy includes 6.5-7.25 wt. % (Nb+Ta).

Tantalum may increase the density and may increase the cost of the titanium alloy. Thus, in one approach the titanium alloy is free of tantalum, containing tantalum only as an impurity (e.g., not greater than 0.2 wt. % Ta, or not greater than 0.5 wt. % Ta). Thus, in this approach the new titanium alloys include 6.5-8.5 wt. % Nb. In one embodiment, a titanium alloy includes at least 6.75 wt. % Nb. In another embodiment, a titanium alloy includes at least 7.0 wt. % Nb. In yet another embodiment, a titanium alloy includes at least 7.25 wt. % Nb. In one embodiment, a titanium alloy includes not greater than 8.25 wt. % Nb. In another embodiment, a titanium alloy includes not greater than 8.0 wt. % Nb. In yet another embodiment, a titanium alloy includes not greater than 7.75 wt. % Nb. In another embodiment, a titanium alloy includes not greater than 7.5 wt. % Nb. In yet another embodiment, a titanium alloy includes not greater than 7.25 wt. % Nb. In one embodiment, a titanium alloy includes 7.25-8.25 wt. % Nb. In one embodiment, a titanium alloy includes 6.5-7.25 wt. % Nb.

The new titanium alloys generally include 1.5-3.5 wt. % Sn. Tin may, for instance, facilitate improved strength of the alloy. Tin may facilitate strengthening of the alpha phase (also referred to as the "hexagonal close-packed phase" and "hcp phase") and/or beta (bcc) phase. In this regard, the new titanium alloys generally include at least 1.5 wt. % Sn. However, too much tin (e.g., greater than 3.5 wt. %) may facilitate the formation of the $\alpha_2$-Ti$_3$Al phase that may reduce the ductility of the alloy. In one embodiment, a titanium alloy includes at least 1.75 wt. % Sn. In another embodiment, a titanium alloy includes at least 2.0 wt. % Sn. In yet another embodiment, a titanium alloy includes at least 2.25 wt. % Sn. In another embodiment, a titanium alloy includes at least 2.5 wt. % Sn. In one embodiment, a titanium alloy includes not greater than 3.25 wt. % Sn. In another embodiment, a titanium alloy includes not greater than 3.0 wt. % Sn. In yet another embodiment, a titanium alloy includes not greater than 2.75 wt. % Sn. In one embodiment, a titanium alloy includes 2.0-3.5 wt. % Sn. In one embodiment, a titanium alloy includes 2.5-3.5 wt. % Sn.

The new titanium alloys may include up to 5.0 wt. % Zr. Zirconium may, for instance, facilitate improved strength of the alloy. Zirconium may facilitate strengthening of the alpha phase and/or beta phase. However, too much zirconium (e.g., greater than 5.0 wt. %) may facilitate the formation of the $\alpha_2$-Ti$_3$Al phase that may reduce the ductility of the alloy. When present, a titanium alloy generally includes at least 0.5 wt. % Zr. In one embodiment, a titanium alloy includes at least 1.0 wt. % Zr. In another embodiment, a titanium alloy includes at least 1.5 wt. % Zr. In yet another embodiment, a titanium alloy includes at least 2.0 wt. % Zr.

In another embodiment, a titanium alloy includes at least 2.5 wt. % Zr. In yet another embodiment, a titanium alloy includes at least 3.0 wt. % Zr. In one embodiment, a titanium alloy includes not greater than 4.5 wt. % Zr. In another embodiment, a titanium alloy includes not greater than 4.25 wt. % Zr. In yet another embodiment, a titanium alloy includes not greater than 4.0 wt. % Zr. In one embodiment, a titanium alloy includes 2.5-4.5 wt. % Zr. In one embodiment, a titanium alloy includes 2.5-3.5 wt. % Zr. In another embodiment, a titanium alloy includes 3.5-4.5 wt. % Zr.

The new titanium alloys may include up to 2.5 wt. % Mo. Molybdenum may, for instance, facilitate improved strength, for instance, by strengthening the beta phase. However, molybdenum may stabilize the beta phase when present at lower amounts than, for instance, niobium and/or tantalum. In this regard, too much molybdenum (e.g., greater than 2.5 wt. %) may impact the creep resistance. When present, a titanium alloy generally includes at least 0.1 wt. % Mo. In one embodiment, a titanium alloy includes at least 0.3 wt. % Mo. In another embodiment, a titanium alloy includes at least 0.6 wt. % Mo. In yet another embodiment, a titanium alloy includes at least 1.0 wt. % Mo. In another embodiment, a titanium alloy includes at least 1.5 wt. % Mo. In yet another embodiment, a titanium alloy includes at least 1.75 wt. % Mo. In one embodiment, a titanium alloy includes not greater than 2.25 wt. % Mo. In another embodiment, a titanium alloy includes not greater than 1.75 wt. % Mo. In yet another embodiment, a titanium alloy includes not greater than 1.25 wt. % Mo. In another embodiment, a titanium alloy includes not greater than 0.75 wt. % Mo. In yet another embodiment, a titanium alloy includes not greater than 0.6 wt. % Mo. In one embodiment, a titanium alloy includes 0.3-0.6 wt. % Mo. In one embodiment, a titanium alloy includes 1.75-2.25 wt. % Mo.

In some embodiments, the amounts of niobium, tantalum, and molybdenum are interrelated as niobium, tantalum, and molybdenum may stabilize the beta phase. However, too much niobium, tantalum, and molybdenum (e.g., an amount of (Nb+Ta) and Mo greater than 11.0 wt. %) may reduce creep resistance by increasing the amount of beta phase in the titanium alloy. Thus, when molybdenum is present, a titanium alloy includes a total amount of niobium and tantalum plus molybdenum of at least 6.6 (i.e., (wt. % Nb+Ta)+(wt. % Mo)≥6.6 wt. %). In another embodiment, a titanium alloy includes an amount of (Nb+Ta) plus Mo of at least 7.0 wt. %. In yet another embodiment, a titanium alloy includes an amount of (Nb+Ta) plus Mo of at least 7.25 wt. %. In another embodiment, a titanium alloy includes an amount of (Nb+Ta) plus Mo of at least 7.5 wt. %. In one embodiment, a titanium alloy includes an amount of (Nb+Ta) plus Mo of not greater than 11.0 wt. %. In another embodiment, a titanium alloy includes an amount of (Nb+Ta) plus Mo of not greater than 10.5 wt. %. In yet another embodiment, a titanium alloy includes an amount of (Nb+Ta) plus Mo of not greater than 10.0 wt. %. In another embodiment, a titanium alloy includes an amount of (Nb+Ta) plus Mo of not greater than 9.5 wt. %. In yet another embodiment, a titanium alloy includes an amount of (Nb+Ta) plus Mo of not greater than 9.0 wt. %. In one embodiment, a titanium alloy includes an amount of (Nb+Ta) plus Mo of 6.6-10 wt. %. In one embodiment, a titanium alloy includes an amount of (Nb+Ta) plus Mo of 7.0-9.5 wt. %.

As noted above, in one approach the titanium alloy is free of tantalum, containing tantalum only as an impurity (e.g., not greater than 0.2 wt. % Ta, or not greater than 0.5 wt. % Ta). Thus, in this approach the new titanium alloys include an amount of Nb plus Mo of at least 6.6 wt. % (i.e., (wt. % Nb)+(wt. % Mo)≥6.6 wt. %). In another embodiment, a titanium alloy includes an amount of Nb plus Mo of at least 7.0 wt. %. In yet another embodiment, a titanium alloy includes an amount of Nb plus Mo of at least 7.25 wt. %. In another embodiment, a titanium alloy includes an amount of Nb plus Mo of at least 7.5 wt. %. In one embodiment, a titanium alloy includes an amount of Nb plus Mo of not greater than 11.0 wt. %. In another embodiment, a titanium alloy includes an amount of Nb plus Mo of not greater than 10.5 wt. %. In yet another embodiment, a titanium alloy includes an amount of Nb plus Mo of not greater than 10.0 wt. %. In another embodiment, a titanium alloy includes an amount of Nb plus Mo of not greater than 9.5 wt. %. In yet another embodiment, a titanium alloy includes an amount of Nb plus Mo of not greater than 9.0 wt. %. In one embodiment, a titanium alloy includes an amount of Nb plus Mo of 6.6-10 wt. %. In one embodiment, a titanium alloy includes an amount of Nb plus Mo of 7.0-9.5 wt. %.

In some embodiments, the amounts of tin and zirconium are interrelated as both tin and zirconium may facilitate strengthening of the alpha phase and/or beta phase. However, too much tin and zirconium (e.g., an amount of Sn and Zr greater than 8.5 wt. %) may facilitate the formation of the $\alpha_2$-Ti$_3$Al phase that may reduce the ductility of the alloy. Thus, when zirconium is included, a titanium alloy includes a total amount of tin plus zirconium of at least 2.0 wt. % (i.e., Sn (in wt. %)+Zr (in wt. %)≥2.0 wt. %). In another embodiment, a titanium alloy includes a total amount of tin plus zirconium of at least 3.0 wt. %. In yet another embodiment, a titanium alloy includes a total amount of tin plus zirconium of at least 3.5 wt. %. In another embodiment, a titanium alloy includes a total amount of tin plus zirconium of at least 4.0 wt. %. In one embodiment, a titanium alloy includes a total amount of tin plus zirconium of not greater than 8.5 wt. %. In another embodiment, a titanium alloy includes a total amount of tin plus zirconium of not greater than 8.0 wt. %. In yet another embodiment, a titanium alloy includes a total amount of tin plus zirconium of not greater than 7.5 wt. %. In another embodiment, a titanium alloy includes a total amount of tin plus zirconium of not greater than 7.0 wt. %. In yet another embodiment, a titanium alloy includes a total amount of tin plus zirconium of not greater than 6.5 wt. %. In another embodiment, a titanium alloy includes a total amount of tin plus zirconium of not greater than 6.0 wt. %. In one embodiment, a titanium alloy includes a total amount of tin plus zirconium of 2.0-8.0 wt. %. In one embodiment, a titanium alloy includes a total amount of tin plus zirconium of 3.5-7.5 wt. %. In another embodiment, a titanium alloy includes a total amount of tin plus zirconium of 4.0-6.0 wt. %.

II. Incidental Elements and Impurities

As noted above, the new titanium alloys generally include the Al, Nb+Ta, Sn, optional Mo and Zr, in the amounts described above, the balance being titanium, optional incidental elements, and impurities. The optional incidental elements may include up to 0.20 wt. % oxygen (O), up to 0.10 wt. % carbon (C), and up to 0.6 wt. % silicon (Si). Impurities may include up to 0.1 wt. % iron (Fe), up to 0.1 wt. % nickel (Ni), up to 0.3 wt. % copper (Cu), and up to 0.3 wt. % chromium (Cr).

The new titanium alloys may include up to 0.20 wt. % O. Oxygen may, for instance, facilitate stabilization of the alpha phase which may reduce the post-thermal exposure ductility, and/or fracture toughness of the alloy. In this regard, oxygen may unavoidably be introduced into the alloy due to processing techniques. In one embodiment, a titanium alloy includes up to 0.15 wt. % O. In another embodiment, a titanium alloy includes up to 0.10 wt. % O. In one embodiment, a titanium alloy includes 0.04-0.10 wt. % O.

The new titanium alloys may include up to 0.10 wt. % C. Carbon may, for instance, facilitate improved strength and/or may refine the grain structure of the titanium alloy. However, too much carbon may facilitate reduced ductility. Thus, the amount of carbon is restricted to up to 0.10 wt. %. In one embodiment, a titanium alloy includes at least 0.01 wt. % C. In another embodiment, a titanium alloy includes at least 0.02 wt. % C. In yet another embodiment, a titanium alloy includes at least 0.03 wt. % C. In another embodiment, a titanium alloy includes at least 0.05 wt. % C.

The new titanium alloys may include up to 0.6 wt. % Si. Silicon may, for instance, facilitate improved creep resistance. In this regard, up to 0.6 wt. % silicon may facilitate the formation of silicide phases (e.g., $TiSi_2$, $TiSi$, $Ti_5Si_3$, $(Ti:Zr)_5Si_3$, and $Ti_6Si_3$, among others) at the grain boundaries and/or matrix of the alloy. In one embodiment, a titanium alloy includes at least 0.1 wt. % Si. In one embodiment, a titanium alloy includes up to 0.3 wt. % Si. In another embodiment, a titanium alloy includes 0.1-0.3 wt. % Si.

The new titanium alloys may include impurities due to the source of raw materials and/or processing techniques. In this regard, some elements, such as iron, nickel, copper, and chromium may have deleterious effects on at least one of the properties of the new titanium alloys. For instance, too much iron and/or nickel may impact creep resistance. In one embodiment, a titanium alloy includes not greater than 0.10 wt. % Fe. In another embodiment, a titanium alloy includes not greater than 0.05 wt. % Fe. In yet another embodiment, a titanium alloy includes not greater than 0.03 wt. % Fe. In another embodiment, a titanium alloy includes not greater than 0.01 wt. % Fe.

In one embodiment, a titanium alloy includes not greater than 0.10 wt. % Ni. In another embodiment, a titanium alloy includes not greater than 0.05 wt. % Ni. In yet another embodiment, a titanium alloy includes not greater than 0.03 wt. % Ni. In another embodiment, a titanium alloy includes not greater than 0.01 wt. % Ni.

In one embodiment, a titanium alloy includes a restricted amount of copper and/or chromium to facilitate an improved combination of properties. In one embodiment, a titanium alloy includes not greater than 0.3 wt. % Cu. In another embodiment, a titanium alloy includes not greater than 0.15 wt. % Cu. In yet another embodiment, a titanium alloy includes not greater than 0.10 wt. % Cu.

In one embodiment, a titanium alloy includes not greater than 0.3 wt. % Cr. In another embodiment, a titanium alloy includes not greater than 0.15 wt. % Cr. In yet another embodiment, a titanium alloy includes not greater than 0.10 wt. % Cr.

The new titanium alloys may be substantially free of other impurities. In this regard, "substantially free of other impurities" means that the new titanium alloys include not greater than 0.10 wt. % each of impurities other than the above-listed Fe, Ni, Cu, and Cr impurities, wherein the total combined amount of the other impurities is not greater than 0.30 wt. %.

III. Methods of Manufacture i. Non-Additive Manufacturing Methods

In one aspect of the present invention, a new titanium alloy having a composition described herein is produced by cast or wrought methods. For instance, one method of producing a titanium alloy product includes the steps of heating (100) a mixture comprising the Al, Nb+Ta, Sn, optional Mo and Zr, the balance being titanium, optional incidental elements, and impurities within the scope of the compositions described herein. In this regard, the mixture may be heated above a liquidus temperature of the mixture, thereby forming a liquid, cooling (200) the mixture from above its liquidus temperature to below its solidus temperature, wherein, due to the cooling (200), the mixture forms at least some body-centered cubic structures (also referred to as "bcc" and "beta"), some of which may transform to hexagonal close-packed structures (also referred to as "hcp" or "alpha") at or below the beta transus temperature of the particular alloy composition. Thus, cooling (200) the mixture below the solidus of the particular alloy composition may facilitate the production of an alpha-beta solid solution structure within the alloy. Furthermore, cooling (300) the solid product to a temperature below the solvus temperature of the particular alloy composition may facilitate the formation of one or more precipitate phases the solid product, such as $\alpha_2$-$Ti_3Al$, and silicide phases (listed above), among others.

In one embodiment, controlled cooling of the material is employed to facilitate realization of an appropriate end product (e.g., a crack-free ingot). For instance, a method may include the step of (400) cooling the product to ambient temperature, and a method may include controlling rates of cooling during one or more of cooling steps (200), (300) and (400) such that, upon conclusion of step (400), a crack-free product is realized. In one embodiment, the crack-free product is a crack-free ingot. Controlled cooling may be accomplished by, for instance, using an appropriate water cooled casting mold.

As used herein, "ingot" means a cast product suitable for further processing. The term "ingot" includes billet. As used herein, "fabricating ingot" means an ingot suitable for subsequent working into a final product. The subsequent working may include, for instance, hot working and/or cold working via any of rolling, forging, extrusion, as well as stress relief by compression and/or stretching.

In one embodiment, a crack-free product, such as a crack-free ingot, may be processed, as appropriate, to obtain a final wrought product from the material. For instance, and referring now to FIGS. 1a-1b, steps (100)-(400) of FIG. 1a, described above, may be considered a casting step (10), shown in FIG. 1b, resulting in the above-described crack-free ingot. In other embodiments, the crack-free product may be a crack-free preform produced by, for instance, shape casting, additive manufacturing or powder metallurgy. In any event, the crack-free product may be further processed to obtain a wrought final product. This further processing may include any combination of dissolving (20) and working (30) steps, described below, as appropriate to achieve the final product form. Once the final product form is realized, the material may be precipitation hardened (40) to develop strengthening precipitates. The final product form may be a rolled product, an extruded product or a forged product, for instance.

With continued reference to FIG. 1b, as a result of the casting step (10), the ingot may include some second phase particles. The method may therefore include one or more dissolving steps (20), where the ingot, an intermediate product form and/or the final product form are heated above the solvus temperature of the applicable precipitate(s) but below the solidus temperature of the material, thereby dissolving some of or all of the second phase particles. The dissolving step (20) may include soaking the material for a time sufficient to dissolve the applicable second phase particles. After the soak, the material may be cooled (e.g., to ambient temperature) for subsequent working. Alternatively, after the soak, the material may be immediately hot worked via the working step (30).

The working step (30) generally involves hot working and/or cold working the ingot and/or an intermediate product form. The hot working and/or cold working may include rolling, extrusion or forging of the material, for instance. The working (30) may occur before and/or after any dissolving step (20). For instance, after the conclusion of a dissolving step (20), the material may be allowed to cool to ambient temperature, and then reheated to an appropriate temperature for hot working. Alternatively, the material may be cold worked at around ambient temperatures. In some embodiments, the material may be hot worked, cooled to ambient, and then cold worked. In yet other embodiments, the hot working may commence after a soak of a dissolving step (20) so that reheating of the product is not required for hot working.

The working step (30) may result in precipitation of second phase particles. In this regard, any number of post-working dissolving steps (20) can be utilized, as appropriate, to dissolve some of or all of the second phase particles that may have formed due to the working step (30).

After any appropriate dissolving (20) and working (30) steps, the final product form may be precipitation hardened (40). The precipitation hardening (40) may include heating the final product form to above the applicable solvus temperature(s) for a time sufficient to dissolve at least some second phase particles precipitated due to the working, and then rapidly cooling the final product form to below the applicable solvus temperature(s) thereby forming precipitate particles, or rapidly cooling to ambient temperature, and then reheating the product to one or more temperatures below the applicable solvus temperature(s), thereby forming precipitate particles. The precipitation hardening (40) will further include holding the product at the target temperature for a time sufficient to form strengthening precipitates, and then cooling the product to ambient temperature, thereby realizing a final heat treated product having strengthening precipitates therein. The strengthening precipitates are preferably located within the matrix of the titanium alloy, thereby conferring strength to the product through interactions with dislocations.

As noted above, the new titanium alloys may be in the form of a wrought product. In one embodiment, the wrought product may be a rolled product (e.g. a sheet or a plate). In one embodiment, the wrought product may be an extruded product. In one embodiment, the wrought product may be a forged product.

The new titanium alloys described herein can also be used to produce shape cast products or preforms. Shape cast products are those products that achieve their final or near final product form after the casting process. The new materials may be shape cast into any desired shape. After casting, the shape cast product may be subject to any appropriate dissolving (20) or precipitation hardening (40) steps, as described above. In one embodiment, a shape cast product comprises the Al, Nb+Ta, Sn, optional Mo and Zr, the balance being titanium, optional incidental elements, and impurities and within the scope of the compositions described above.

The new titanium alloys described herein may also be used to produce titanium alloy products via powder metallurgy methods. For instance, a powder comprising the comprising the Al, Nb+Ta, Sn, optional Mo and Zr, the balance being titanium, optional incidental elements, and impurities, and within the scope of the compositions described above may be used to produce a powder metallurgy product. In this regard, the powder may be produced by suitable methods, such as by mechanical, chemical, and physical methods (e.g., atomization). For instance, mechanical methods for producing powders may include machining, milling, and/or mechanical alloying. Chemical methods for producing powders may include electrolytic deposition, thermal decomposition, precipitation from a liquid, precipitation from a gas, and/or solid-solid reactive synthesis. In this regard, the powder may comprise alloyed particles (i.e., a chemical mixture of elements) and/or non-alloyed particles (i.e., particles essentially consisting of one element). For instance, any combination of alloyed and non-alloyed powders may be blended to realize a titanium alloy powder having a composition described herein.

As used herein, "powder" means a material comprising a plurality of particles. As used herein, a "particle" means a minute fragment of matter having a size suitable for use in the powder of the powder bed (e.g., a size of from 5 microns to 100 microns).

Titanium alloy powders may be compacted into final or near-final product form. For instance, the powder may be compacted via low pressure methods such as, loose powder sintering, slip casting, slurry casting, tape casting, or vibratory compaction. In another aspect, pressure may be used to realize the compaction by methods such as, for instance, die compaction, cold/hot isostatic pressing, and/or sintering. Such methods may facilitate production of crack-free final or near-final products. In any event, the crack-free product may be further processed to obtain a wrought final product. This further processing may include any combination of dissolving (20) and working (30) steps, described above, as appropriate to achieve the final product form. Once the final product form is realized, the material may be precipitation hardened (40) to develop strengthening precipitates. The final product form may be a rolled product, an extruded product or a forged product, for instance.

ii. Additive Manufacturing Methods

It is also possible to manufacture the new titanium alloy products by additive manufacturing. As used herein, "additive manufacturing" means, "a process of joining materials to make objects from 3D model data, usually layer upon layer, as opposed to subtractive manufacturing methodologies", as defined in ASTM F2792-12a entitled "Standard Terminology for Additively Manufacturing Technologies". The new titanium alloy products may be manufactured via any appropriate additive manufacturing technique described in this ASTM standard, such as binder jetting, directed energy deposition, material extrusion, material jetting, powder bed fusion, or sheet lamination, among others. Non-limiting examples of additive manufacturing processes useful in producing crack-free titanium alloy products include, for instance, DMLS (direct metal laser sintering), SLM (selective laser melting), SLS (selective laser sintering), and EBM (electron beam melting), among others. Any suitable feedstocks may be used, including one or more powders, one or more wires, and combinations thereof. In some embodiments the additive manufacturing feedstock is comprised of one or more powders. Shavings are types of particles. In some embodiments, the additive manufacturing feedstock is comprised of one or more wires. A ribbon is a type of wire.

In one embodiment, an additive manufacturing process includes depositing successive layers of one or more powders and then selectively melting and/or sintering the powders to create, layer-by-layer, an additively manufactured product. In one embodiment, an additive manufacturing process uses one or more of Selective Laser Sintering (SLS), Selective Laser Melting (SLM), and Electron Beam Melting (EBM), among others. In one embodiment, an additive manufacturing process uses an EOSINT M 280 Direct Metal Laser Sintering (DMLS) additive manufacturing system, or comparable system, available from EOS GmbH (Robert-Stirling-Ring 1, 82152 Krailling/Munich, Germany).

As one example, a feedstock, such as a powder or wire, comprising (or consisting essentially of) the Al, Nb+Ta, Sn, optional Mo and Zr, the balance being titanium, optional incidental elements, and impurities, and within the scope of the compositions described above, may be used in an additive manufacturing apparatus to produce an additively manufactured product. In some embodiments, the additively manufactured product is a crack-free preform. The powders may be selectively heated above the liquidus temperature of the material, thereby forming a molten pool having the compositions described herein, followed by rapid solidification of the molten pool.

As noted above, additive manufacturing may be used to create, layer-by-layer, a metal product (e.g., an alloy product), such as via a metal powder bed. In one embodiment, a metal powder bed is used to create a product (e.g., a tailored alloy product). As used herein a "metal powder bed" and the like, means a bed comprising a metal powder. During additive manufacturing, particles of the same or different compositions may melt (e.g., rapidly melt) and then solidify (e.g., in the absence of homogenous mixing). Thus, products having a homogenous or non-homogeneous microstructure may be produced. One embodiment of a method of making an additively manufactured product may include (a) dispersing a powder comprising the alloying elements having a balance of titanium, optional incidental elements, and impurities, (b) selectively heating a portion of the powder (e.g., via a laser) to a temperature above the liquidus temperature of the particular product to be formed, (c) forming a molten pool having the alloying elements and any optional incidental elements, and (d) cooling the molten pool at a cooling rate of at least 1000° C. per second. In one embodiment, the cooling rate is at least 10,000° C. per second. In another embodiment, the cooling rate is at least 100,000° C. per second. In another embodiment, the cooling rate is at least 1,000,000° C. per second. Steps (a)-(d) may be repeated as necessary until the final or near-final product is completed, i.e., until the final additively manufactured product is formed/completed. The final additively manufactured product may be of a complex geometry, or may be of a simple geometry (e.g., in the form of a sheet or plate). After or during production, an additively manufactured product may be deformed (e.g., by one or more of rolling, extruding, forging, stretching, compressing).

The powders used to additively manufacture a new material may be produced by atomizing a material (e.g., an ingot or melt) of the new material into powders of the appropriate dimensions relative to the additive manufacturing process to be used.

The additively manufactured product may be subject to any appropriate dissolving (20), working (30) and/or precipitation hardening steps (40), as described above. If employed, the dissolving (20) and/or the working (30) steps may be conducted on an intermediate form of the additively manufactured product and/or may be conducted on a final form of the additively manufactured product. If employed, the precipitation hardening step (40) is generally conducted relative to the final form of the additively manufactured product.

In another embodiment, a titanium alloy product is a preform for subsequent working. A preform may be an ingot, a shape casting, an additively manufactured product, or a powder metallurgy product. In one embodiment, a preform is of a shape that is close to the final desired shape of the final product, but the preform is designed to allow for subsequent working to achieve the final product shape. Thus, the preform may be worked (30) such as by forging, rolling, or extrusion to produce an intermediate product or a final product, which intermediate or final product may be subject to any further appropriate dissolving (20), working (30) and/or precipitation hardening steps (40), as described above, to achieve the final product. In one embodiment, the working comprises hot isostatic pressing (hipping) to compress the part. In one embodiment, a titanium alloy preform may be compressed and porosity may be reduced. In one embodiment, the hipping temperature is maintained below the incipient melting point of the alloy preform. In one embodiment, the preform may be a near net shape product.

In one approach, electron beam (EB) or plasma arc techniques are utilized to produce at least a portion of the additively manufactured product. Electron beam techniques may facilitate production of larger parts than readily produced via laser additive manufacturing techniques. In one embodiment, a method comprises feeding a wire (e.g., ≤2.54 mm in diameter) to the wire feeder portion of an electron beam gun. The wire may be of the compositions described above. The electron beam (EB) heats the wire above the liquidus point of the product to be formed, followed by rapid solidification (e.g., at least 100° C. per second) of the molten pool to form the deposited material. The wire could be fabricated by a conventional ingot process or by a powder consolidation process. These steps may be repeated as necessary until the final product is produced. Plasma arc wire feed may similarly be used with the new titanium alloys disclosed herein. In one embodiment, not illustrated, an electron beam (EB) or plasma arc additive manufacturing apparatus may employ multiple different wires with corresponding multiple different radiation sources, each of the wires and sources being fed and activated, as appropriate to provide the additively manufactured product.

IV. Properties

The new titanium alloy products may realize high strength. In one embodiment, a titanium alloy product (e.g., a wrought titanium alloy product, such as a forging, extrusion, or a sheet/plate) realizes an ultimate tensile strength of at least 130 ksi at room temperature when measured in accordance with ASTM E8-15a. In another embodiment, a titanium alloy product realizes an ultimate tensile strength of at least 150 ksi at room temperature. In yet another embodiment, a titanium alloy product realizes an ultimate tensile strength of at least 160 ksi at room temperature. In another embodiment, a titanium alloy product realizes an ultimate tensile strength of at least 170 ksi at room temperature. In yet another embodiment, a titanium alloy product realizes an ultimate tensile strength of at least 175 ksi at room temperature. In another embodiment, a titanium alloy product realizes an ultimate tensile strength of at least 180 ksi at room temperature. In yet another embodiment, a titanium alloy product realizes an ultimate tensile strength of at least 185 ksi at room temperature. In another embodiment, a titanium alloy product realizes an ultimate tensile strength of at least 188 ksi at room temperature. In yet another embodiment, a titanium alloy product realizes an ultimate tensile strength of at least 190 ksi at room temperature. In another embodiment, a titanium alloy product realizes an ultimate tensile strength of at least 192 ksi, or higher, at room temperature.

In one embodiment, a titanium alloy product realizes a tensile yield strength of at least 120 ksi at room temperature when measured in accordance with ASTM E8-15a. In another embodiment, a titanium alloy product realizes a tensile yield strength of at least 130 ksi at room temperature. In yet another embodiment, a titanium alloy product realizes a tensile yield strength of at least 135 ksi at room temperature. In another embodiment, a titanium alloy product realizes a tensile yield strength of at least 140 ksi at room temperature. In yet another embodiment, a titanium alloy product realizes a tensile yield strength of at least 145 ksi at room temperature. In another embodiment, a titanium alloy product realizes a tensile yield strength of at least 150 ksi at room temperature. In yet another embodiment, a titanium alloy product realizes a tensile yield strength of at least 155 ksi at room temperature. In another embodiment, a titanium alloy product realizes a tensile yield strength of at least 160 ksi at room temperature. In another embodiment, a titanium alloy product realizes a tensile yield strength of at least 165 ksi at room temperature. In yet another embodiment, a titanium alloy product realizes a tensile yield strength of at least 170 ksi at room temperature. In another embodiment, a titanium alloy product realizes a tensile yield strength of at least 175 ksi at room temperature. In yet another embodiment, a titanium alloy product realizes a tensile yield strength of at least 177 ksi, or higher, at room temperature.

In one embodiment, a titanium alloy product realizes an ultimate tensile strength of at least 115 ksi at 800° F. when measured in accordance with ASTM E21-09a. In another embodiment, a titanium alloy product realizes an ultimate tensile strength of at least 125 ksi at 800° F. In yet another embodiment, a titanium alloy product realizes an ultimate tensile strength of at least 135 ksi at 800° F. In another embodiment, a titanium alloy product realizes an ultimate tensile strength of at least 140 ksi at 800° F. In yet another embodiment, a titanium alloy product realizes an ultimate tensile strength of at least 145 ksi at 800° F. In another embodiment, a titanium alloy product realizes an ultimate tensile strength of at least 150 ksi at 800° F. In yet another embodiment, a titanium alloy product realizes an ultimate tensile strength of at least 155 ksi at 800° F. In another embodiment, a titanium alloy product realizes an ultimate tensile strength of at least 158 ksi, or higher, at 800° F.

In one embodiment, a titanium alloy product realizes an ultimate tensile strength of at least 90 ksi at 900° F. when measured in accordance with ASTM E21-09. In another embodiment, a titanium alloy product realizes an ultimate tensile strength of at least 100 ksi at 900° F. In yet another embodiment, a titanium alloy product realizes an ultimate tensile strength of at least 110 ksi at 900° F. In another embodiment, a titanium alloy product realizes an ultimate tensile strength of at least 120 ksi at 900° F. In yet another embodiment, a titanium alloy product realizes an ultimate tensile strength of at least 125 ksi at 900° F. In another embodiment, a titanium alloy product realizes an ultimate tensile strength of at least 130 ksi at 900° F. In yet another embodiment, a titanium alloy product realizes an ultimate tensile strength of at least 135 ksi at 900° F. In another embodiment, a titanium alloy product realizes an ultimate tensile strength of at least 140 ksi at 900° F. In yet another embodiment, a titanium alloy product realizes an ultimate tensile strength of at least 145 ksi at 900° F. In another embodiment, a titanium alloy product realizes an ultimate tensile strength of at least 148 ksi, or higher, at 900° F.

In one embodiment, a titanium alloy product realizes a tensile yield strength of at least 90 ksi at 800° F. when measured in accordance with ASTM E21-09a. In another embodiment, a titanium alloy product realizes a tensile yield strength of at least 95 ksi at 800° F. In yet another embodiment, a titanium alloy product realizes a tensile yield strength of at least 100 ksi at 800° F. In another embodiment, a titanium alloy product realizes a tensile yield strength of at least 105 ksi at 800° F. In yet another embodiment, a titanium alloy product realizes a tensile yield strength of at least 110 ksi at 800° F. In another embodiment, a titanium alloy product realizes a tensile yield strength of at least 115 ksi at 800° F. In yet another embodiment, a titanium alloy product realizes a tensile yield strength of at least 120 ksi at 800° F. In another embodiment, a titanium alloy product realizes a tensile yield strength of at least 125 ksi at 800° F. In yet another embodiment, a titanium alloy product realizes a tensile yield strength of at least 130 ksi, or higher, at 800° F.

In one embodiment, a titanium alloy product realizes a tensile yield strength of at least 70 ksi at 900° F. when measured in accordance with ASTM E21-09a. In another embodiment, a titanium alloy product realizes a tensile yield strength of at least 80 ksi at 900° F. In yet another embodiment, a titanium alloy product realizes a tensile yield strength of at least 85 ksi at 900° F. In another embodiment, a titanium alloy product realizes a tensile yield strength of at least 90 ksi at 900° F. In yet another embodiment, a titanium alloy product realizes a tensile yield strength of at least 95 ksi at 900° F. In another embodiment, a titanium alloy product realizes a tensile yield strength of at least 100 ksi at 900° F. In yet another embodiment, a titanium alloy product realizes a tensile yield strength of at least 105 ksi at 900° F. In another embodiment, a titanium alloy product realizes a tensile yield strength of at least 110 ksi at 900° F. In yet another embodiment, a titanium alloy product realizes a tensile yield strength of at least 115 ksi at 900° F. In another embodiment, a titanium alloy product realizes a tensile yield strength of at least 118 ksi, or higher, at 900° F.

The new titanium alloy products may be ductile. In one embodiment, a titanium alloy product realizes an elongation of at least 8.0% at room temperature when measured in accordance with ASTM E8-15a. In another embodiment, a titanium alloy product realizes an elongation of at least 8.5% at room temperature. In yet another embodiment, a titanium alloy product realizes an elongation of at least 9.0% at room temperature. In another embodiment, a titanium alloy product realizes an elongation of at least 9.5% at room temperature. In yet another embodiment, a titanium alloy product realizes an elongation of at least 10.0% at room temperature. In another embodiment, a titanium alloy product realizes an elongation of at least 10.5% at room temperature. In yet another embodiment, a titanium alloy product realizes an elongation of at least 11.0% at room temperature. In another embodiment, a titanium alloy product realizes an elongation of at least 11.5% at room temperature. In yet another embodiment, a titanium alloy product realizes an elongation of at least 12.0% at room temperature. In another embodiment, a titanium alloy product realizes an elongation of at least 13.0%, or higher, at room temperature.

In one embodiment, a titanium alloy product realizes an elongation of at least 8.0% at 800° F. when measured in accordance with ASTM E21-09a. In another embodiment, a titanium alloy product realizes an elongation of at least 9.0% at 800° F. In yet another embodiment, a titanium alloy product realizes an elongation of at least 10.0% at 800° F. In another embodiment, a titanium alloy product realizes an elongation of at least 10.5% at 800° F. In yet another embodiment, a titanium alloy product realizes an elongation of at least 11.0% at 800° F. In another embodiment, a titanium alloy product realizes an elongation of at least 10.5% at 800° F. In yet another embodiment, a titanium alloy product realizes an elongation of at least 11.0% at 800° F. In another embodiment, a titanium alloy product realizes an elongation of at least 11.5% at 800° F. In yet another embodiment, a titanium alloy product realizes an elongation of at least 12.0% at 800° F. In another embodiment, a titanium alloy product realizes an elongation of at least 12.5% at 800° F. In yet another embodiment, a titanium alloy product realizes an elongation of at least 13.0% at 800° F. In another embodiment, a titanium alloy product realizes an elongation of at least 13.5% at 800° F. In yet another embodiment, a titanium alloy product realizes an elongation of at least 14.0% at 800° F. In another embodiment, a titanium alloy product realizes an elongation of at least 14.5%, or higher, at 800° F.

In one embodiment, a titanium alloy product realizes an elongation of at least 12.0% at 900° F. when measured in accordance with ASTM E21-09a. In another embodiment, a titanium alloy product realizes an elongation of at least 12.5% at 900° F. In yet another embodiment, a titanium alloy product realizes an elongation of at least 13.0% at 900° F. In another embodiment, a titanium alloy product realizes an elongation of at least 13.5% at 900° F. In yet another embodiment, a titanium alloy product realizes an elongation of at least 14.0% at 900° F. In another embodiment, a titanium alloy product realizes an elongation of at least 14.5% at 900° F. In yet another embodiment, a titanium alloy product realizes an elongation of at least 15.0% at 900° F. In another embodiment, a titanium alloy product realizes an elongation of at least 15.5% at 900° F. In yet another embodiment, a titanium alloy product realizes an elongation of at least 16.0% at 900° F. In another embodiment, a titanium alloy product realizes an elongation of at least 16.5% at 900° F. In yet another embodiment, a titanium alloy product realizes an elongation of at least 17.0% at 900° F. In another embodiment, a titanium alloy product realizes an elongation of at least 17.5% at 900° F. In yet another embodiment, a titanium alloy product realizes an elongation of at least 18.0% at 900° F. In another embodiment, a titanium alloy product realizes an elongation of at least 18.5%, or higher, at 900° F.

The new titanium alloy products may realize good resistance to creep. In one embodiment, at a stress of 95 ksi and a temperature of 800° F., a titanium alloy product realizes a creep deformation of not greater than 0.6% at 35 hours when measured in accordance with ASTM E139-11. In another embodiment, the creep deformation is not greater than 0.5%. In yet another embodiment, the creep deformation is not greater than 0.4%. In another embodiment, the creep deformation is not greater than 0.35%. In yet another embodiment, the creep deformation is not greater than 0.30%. In another embodiment, the creep deformation is not greater than 0.25%. In yet another embodiment, the creep deformation is not greater than 0.2%. In another embodiment, the creep deformation is not greater than 0.15%. In yet another embodiment, the creep deformation is not greater than 0.10%, or lower.

In one embodiment, at a stress of 95 ksi and a temperature of 800° F., a titanium alloy product realizes a creep deformation of not greater than 0.6% at 100 hours when measured in accordance with ASTM E139-11. In another embodiment, the creep deformation is not greater than 0.5%. In yet another embodiment, the creep deformation is not greater than 0.4%. In another embodiment, the creep deformation is not greater than 0.3%. In yet another embodiment, the creep deformation is not greater than 0.25%. In another embodiment, the creep deformation is not greater than 0.2%. In yet another embodiment, the creep deformation is not greater than 0.15%, or lower.

In one embodiment, at a stress of 35 ksi and a temperature of 950° F., a titanium alloy product realizes a creep deformation of not greater than 0.4% at 35 hours when measured in accordance with ASTM E139-11. In another embodiment, the creep deformation is not greater than 0.35%. In yet another embodiment, the creep deformation is not greater than 0.30%. In another embodiment, the creep deformation is not greater than 0.25%. In yet another embodiment, the creep deformation is not greater than 0.20%. In another embodiment, the creep deformation is not greater than 0.15%. In yet another embodiment, the creep deformation is not greater than 0.10%. In another embodiment, the creep deformation is not greater than 0.075%. In yet another embodiment, the creep deformation is not greater than 0.060%, or lower.

In one embodiment, at a stress of 35 ksi and a temperature of 950° F., a titanium alloy product realizes a creep deformation of not greater than 0.6% at 100 hours when measured in accordance with ASTM E139-11. In another embodiment, the creep deformation is not greater than 0.5%. In yet another embodiment, the creep deformation is not greater than 0.4%. In yet another embodiment, the creep deformation is not greater than 0.3%. In another embodiment, the creep deformation is not greater than 0.2%. In yet another embodiment, the creep deformation is not greater than 0.15%. In another embodiment, the creep deformation is not greater than 0.10%. In yet another embodiment, the creep deformation is not greater than 0.075%, or lower.

The new titanium alloy products may realize good resistance to dwell fatigue. In one embodiment, a titanium alloy product realizes a room temperature dwell fatigue life ("RTDFL") of at least 2,500 cycles, wherein the measurement is performed at a maximum fatigue stress corresponding to 95% of the titanium alloy product's room temperature tensile yield strength (measured in accordance with ASTM E8-15a), and wherein the measurement is performed in accordance with ASTM E466-15. In another embodiment, the dwell fatigue life is at least 4,000 cycles. In yet another embodiment, the dwell fatigue life is at least 5,000 cycles. In another embodiment, the dwell fatigue life is at least 6,000 cycles. In yet another embodiment, the dwell fatigue life is at least 7,000 cycles. In another embodiment, the dwell fatigue life is at least 8,000 cycles. In yet another embodiment, the dwell fatigue life is at least 8,500 cycles. In another embodiment, the dwell fatigue life is at least 9,000 cycles. In yet another embodiment, the dwell fatigue life is at least 9,500 cycles, or more.

In one embodiment, a titanium alloy product realizes a room temperature low cycle fatigue life ("RTLCFL") of at least 10,000 cycles, wherein the measurement is performed at a maximum fatigue stress corresponding to 95% of the titanium alloy product's room temperature tensile yield strength (measured in accordance with ASTM E8-15a), and wherein the measurement is performed in accordance with ASTM E466-15. In another embodiment, the low cycle fatigue life is at least 15,000 cycles. In yet another embodiment, the low cycle fatigue life is at least 17,000 cycles. In another embodiment, the low cycle fatigue life is at least 19,000 cycles, or higher.

The new titanium alloy products may realize a dwell fatigue life debit of not greater than 10, wherein the dwell fatigue life debit is a ratio of the low cycle fatigue life to the dwell fatigue life (i.e., RTLCFL/RTDFL), wherein the low cycle fatigue life and dwell fatigue life are measured in accordance with ASTM E466-15, and wherein the maximum fatigue stress for both measurements corresponds to 95% of the titanium alloy product's room temperature tensile yield strength (measured in accordance with ASTM E8-15a). In another embodiment, the dwell fatigue life debit is not greater than 8.0. In yet another embodiment, the dwell fatigue life debit is not greater than 6.0. In another embodiment, the dwell fatigue life debit is not greater than 5.0. In yet another embodiment, the dwell fatigue life debit is not greater than 4.5. In another embodiment, the dwell fatigue life debit is not greater than 4.0. In yet another embodiment, the dwell fatigue life debit is not greater than 3.5. In another embodiment, the dwell fatigue life debit is not greater than 3.0. In yet another embodiment, the dwell fatigue life debit is not greater than 2.75. In another embodiment, the dwell fatigue life debit is not greater than 2.50. In yet another embodiment, the dwell fatigue life debit is not greater than 2.25. In yet another embodiment, the dwell fatigue life debit is not greater than 2.15.

Combinations of the above described properties may be achieved.

V. Product Applications

Due to their improved combination of properties, the new titanium alloy products described herein may be used in a variety of product applications. In one embodiment, a new titanium alloy product is utilized in an elevated temperature application, such as in an aerospace or automotive vehicle. In one embodiment, a new titanium alloy product is utilized as an engine component in an aerospace vehicle (e.g., in the form of compressor blades, disks, blisks, casings, and vanes). In another embodiment, a new titanium alloy product is used as a heat exchanger for the engine of an aerospace vehicle. The aerospace vehicle including the engine component/heat exchanger may subsequently be operated. In one embodiment, a new titanium alloy product is an automotive engine component (e.g., a turbo charger component; an automotive valve). The automotive vehicle, including the engine component, may subsequently be operated. For instance, a new titanium alloy product may be used as a turbo charger component (e.g., a compressor wheel of a turbo charger, where elevated temperatures may be realized due to recycling engine exhaust back through the turbo charger), and the automotive vehicle including the turbo charger component may be operated. In another embodiment, a new titanium alloy product may be used as a blade in a land based (stationary) turbine for electrical power generation, and the land based turbine included the titanium alloy product may be operated to facilitate electrical power generation.

In one embodiment, a new titanium alloy product is utilized as a structural component of an aerospace vehicle. For instance, the new titanium alloy products may be formed into various components for use in the aerospace industry, such as floor beams, seat rails, pylons, and fuselage framing, among others. In some embodiments, a new titanium alloy product is utilized in a defense application, such as in body armor, and armed vehicles (e.g., armor plating).

Aside from the applications described above, the new titanium alloy products of the present disclosure may also be utilized in a variety of consumer products, such as any consumer electronic products, including laptops, cell phones, cameras, mobile music players, handheld devices, computers, televisions, microwave, cookware, washer/dryer, refrigerator, sporting goods, or any other consumer electronic product requiring durability and selective visual appearance. In one embodiment, the visual appearance of the consumer electronic product meets consumer acceptance standards.

In some embodiments, the new titanium alloy products of the present disclosure may be utilized in a variety of products including non-consumer products including the likes of medical devices, transportation systems and security systems, to name a few. In other embodiments, the new titanium alloy products may be incorporated in goods including the likes of car panels, media players, bottles and cans, office supplies, packages and containers, among others.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on", unless the context clearly dictates otherwise.

BRIEF DESCRIPTION OF THE DRAWINGS

FIG. 4a is an electron micrograph of the dwell fatigue fracture surface for Alloy 1.

FIG. 4b is an electron micrograph of the dwell fatigue fracture surface for Alloy 3.

FIG. 4c is an electron micrograph of the dwell fatigue fracture surface for Alloy 4.

DETAILED DESCRIPTION

Example 1

Figure 1A:
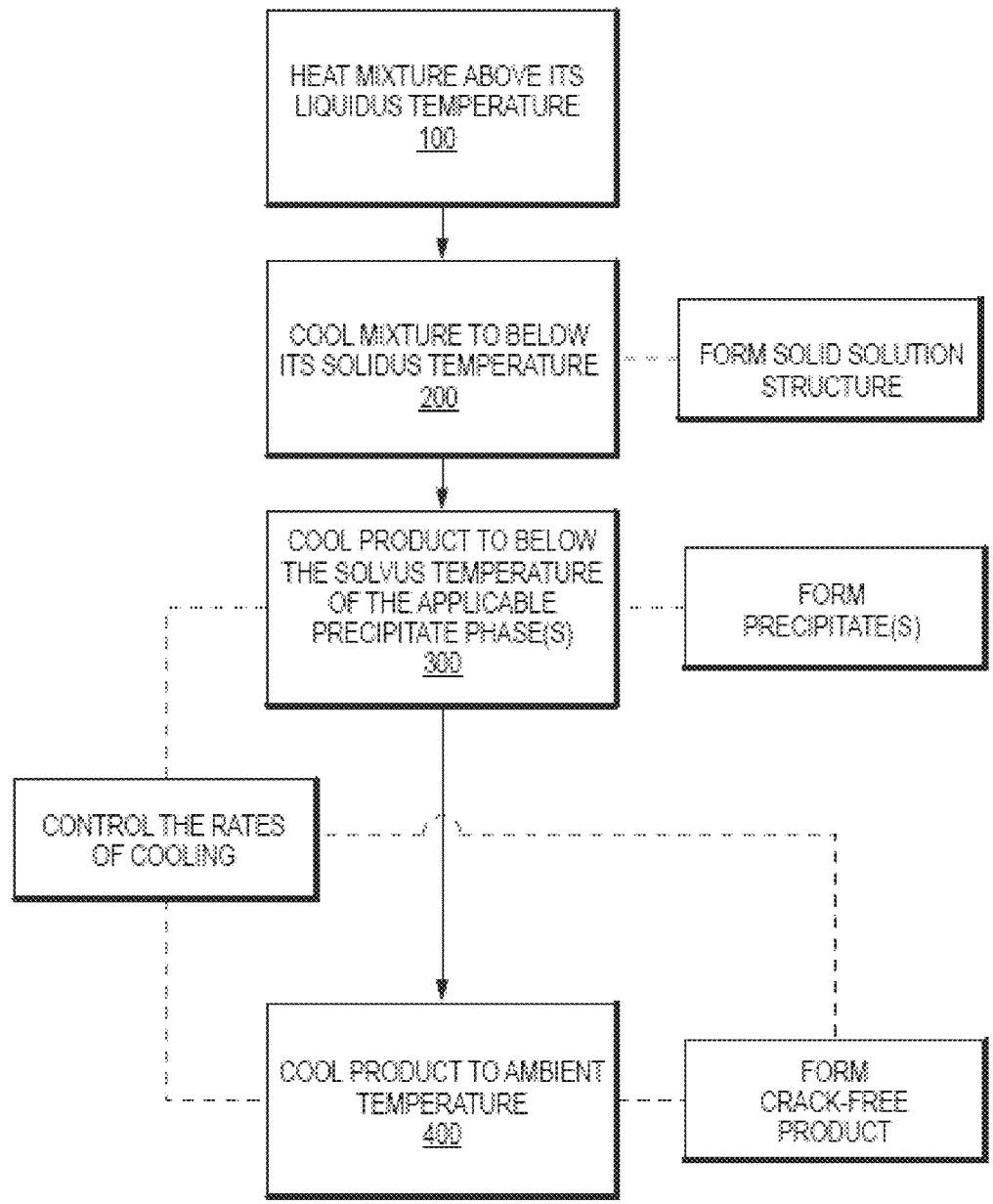
FIG. 1a is a flow chart of one embodiment of a method to produce a new titanium alloy product.
Figure 1B:
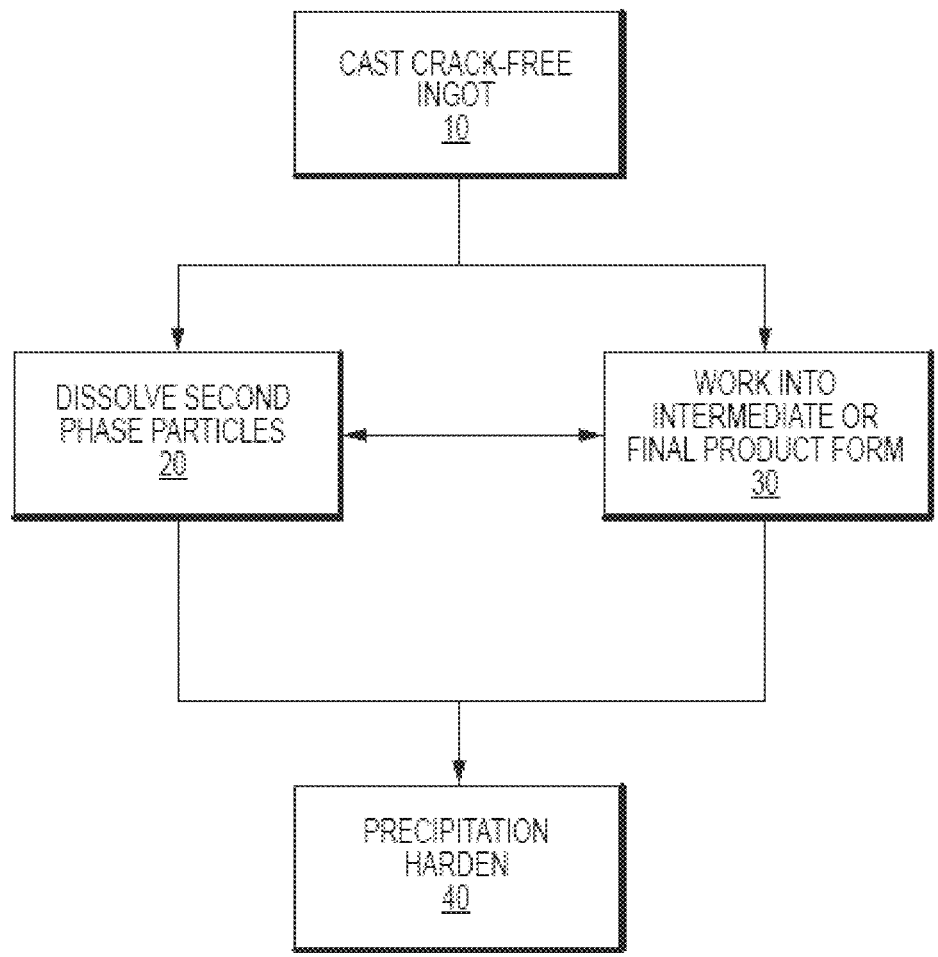
FIG. 1b is a flow chart of one embodiment of a method to obtain a wrought titanium alloy product.
Figure 2A:
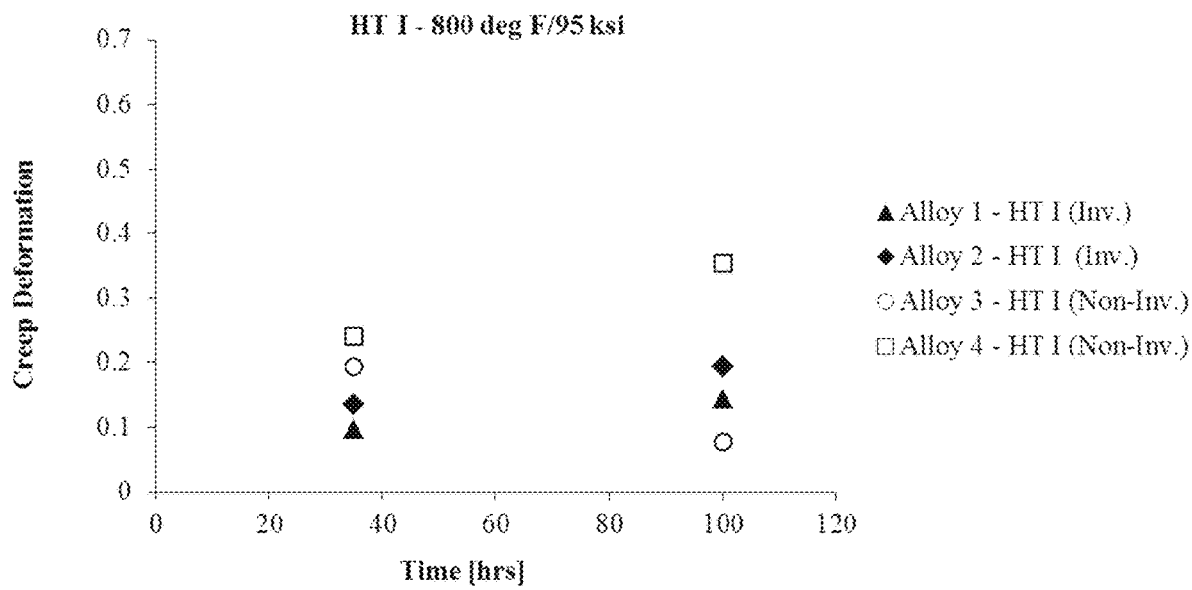
FIG. 2a gives the creep deformation at 800° F. at a stress of 95 ksi for Alloys 1-4 having been heat treated in accordance with HT I.
Figure 2B:
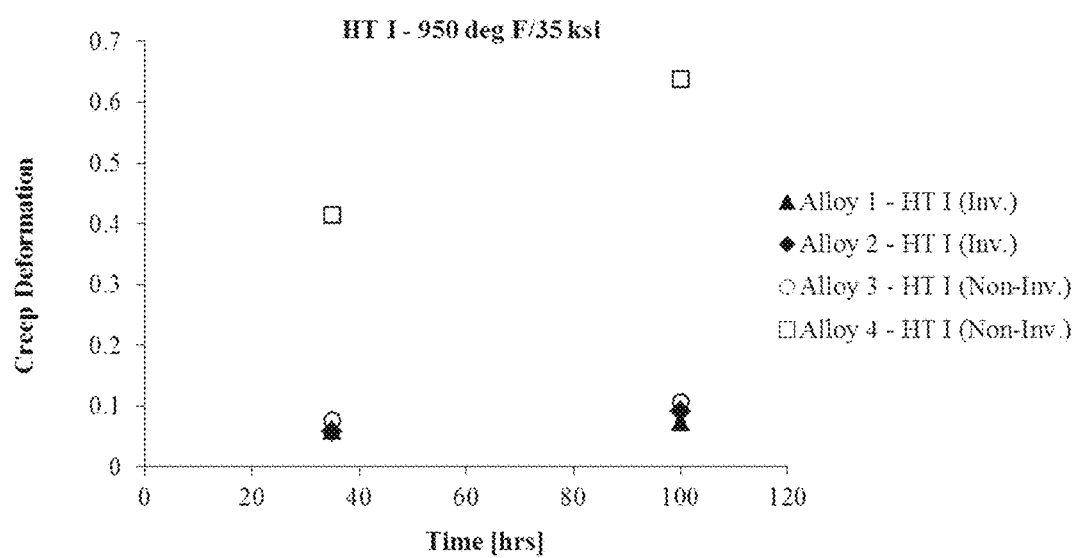
FIG. 2b gives the creep deformation at 950° F. at a stress of 35 ksi for Alloys 1-4 having been heat treated in accordance with HT I.
Figure 2C:
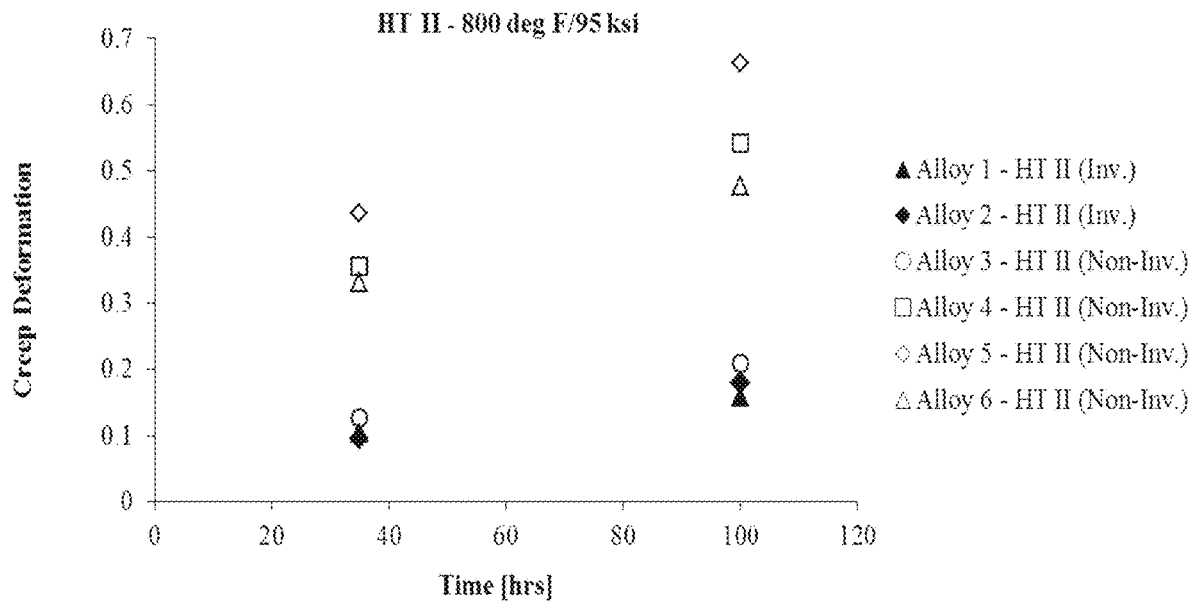
FIG. 2c gives the creep deformation at 800° F. at a stress of 95 ksi for Alloys 1-6 having been heat treated in accordance with HT II.
Figure 2D:
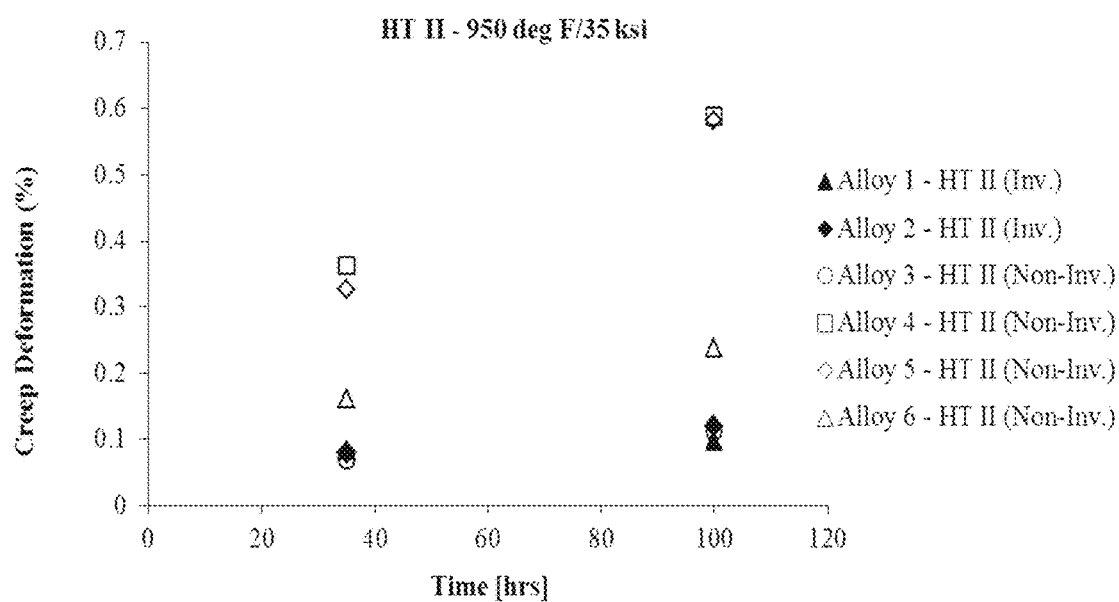
FIG. 2d gives the creep deformation at 950° F. at a stress of 35 ksi for Alloys 1-6 having been heat treated in accordance with HT II.

Six experimental alloys were cast as ingot (6 inches diameter) and then hot forged down to 1.0 in by 7.0 in by L (length) long plates. The target compositions for each of the six experimental alloys are given in Table 1, below. Alloys 1 and 2 are invention ("Inv.") alloys and Alloys 3-6 are non-invention ("Non-Inv.") alloys. In this regard, Alloy 3 is a commercially available alloy known as "Ti-6Al-2Sn-4Zr-2Mo", "Ti-6-2-4-2", or per unified numbering system (UNS) designation R54620. Alloy 4 is also a commercially available alloy known as "Ti-6Al-2Sn-4Zr-6Mo", "Ti-6-2-4-6", or per UNS designation 56260.

TABLE 1

Target Composition of Experimental Alloys (wt. %)

| Alloy No. | Al | Sn | Zr | Nb | Mo | Si | Ti and Impurities |
|---|---|---|---|---|---|---|---|
| 1 (Inv.) | 6.0 | 3.0 | 3.0 | 8.0 | 0.5 | 0.3 | Balance |
| 2 (Inv.) | 6.0 | 3.0 | 3.0 | 7.0 | 2.0 | 0.3 | Balance |
| 3 (Non-Inv.) | 6.0 | 2.0 | 4.0 | 0.0 | 2.0 | 0.1 | Balance |
| 4 (Non-Inv.) | 6.0 | 2.0 | 4.0 | 0.0 | 6.0 | 0.0 | Balance |
| 5 (Non-Inv.) | 6.0 | 6.0 | 0.0 | 8.0 | 0.5 | 0.3 | Balance |
| 6 (Non-Inv.) | 6.0 | 2.0 | 4.0 | 6.0 | 0.5 | 0.3 | Balance |

The compositions of Alloys 1-6 were measured using ICP analysis at the top and bottom of the ingot. The measured compositions are given below, in Tables 2a-2b. Other than the alloying elements (Al, Zr, Mo, Sn, and Nb), incidental elements (Si, O, and C), titanium (Ti), and impurities (not measured) formed the balance of the alloy composition.

TABLE 2a

Measured Alloy Element (Al, Nb, Zr, Mo, and Sn) Contents (wt. %) of Alloys 1-6

| Alloy No. | Al | Nb | Zr | Mo | Sn |
|---|---|---|---|---|---|
| 1 (Inv.) | 5.84-5.98 | 7.63-7.74 | 3.28-3.35 | 0.54-0.61 | 3.11-3.41 |
| 2 (Inv.) | 6.15-6.18 | 6.80-6.99 | 3.22-3.23 | 2.04-2.18 | 3.28-3.33 |
| 3 (Non-Inv.) | 6.31-6.55 | — | 3.97-4.07 | 2.00-2.04 | 2.09-2.11 |
| 4 (Non-Inv.) | 5.77-5.97 | — | 3.68-3.72 | 5.56-5.81 | 1.90-1.91 |
| 5 (Non-Inv.) | 5.98-6.16 | 7.47-7.58 | — | 0.48-0.50 | 5.67-5.70 |
| 6 (Non-Inv.) | 6.00-6.05 | 5.71-5.89 | 4.06-4.29 | 0.49-0.51 | 1.85-1.89 |

TABLE 2a

Measured Incidental Element (Si, O, and C) Contents (wt. %) of Alloys 1-6

| Alloy No. | Si | O | C |
|---|---|---|---|
| 1 (Inv.) | 0.30 | 0.14 | 0.05 |
| 2 (Inv.) | 0.25-0.27 | 0.11-0.14 | 0.04-0.05 |
| 3 (Non-Inv.) | 0.08 | 0.11-0.12 | 0.01 |
| 4 (Non-Inv.) | — | 0.11-0.12 | 0.02 |
| 5 (Non-Inv.) | 0.28-0.29 | 0.10-0.11 | 0.027-0.030 |
| 6 (Non-Inv.) | 0.27 | 0.12-0.13 | 0.027 |

Following preparation of testing samples, the six experimental alloy materials were heat treated according to one of two heat treatment methods ("HT I" and "HT II", described below). Each heat treatment method included heating to a first temperature for one hour and heating to a second temperature for eight hours. The first temperature was chosen relative to the beta transus of the material (e.g., 45° F. below the beta transus). In this regard, the beta transus of each alloy was measured by heat treating specimens of the alloys at various temperatures followed by air cooling the alloy, and then analyzing micrographs of the specimens for the primary volume fraction of alpha phase. The beta transus (BT) for each of Alloys 1-6 is given in Table 3, below.

TABLE 3

Beta Transus Temperatures for Alloys 1-6

| Alloy No. | Beta Transus (° F.) |
|---|---|
| 1 (Inv.) | 1885 |
| 2 (Inv.) | 1840 |
| 3 (Non-Inv.) | 1870 |
| 4 (Non-Inv.) | 1770 |
| 5 (Non-Inv.) | 1840 |
| 6 (Non-Inv.) | 1830 |

Heat treatment method I ("HT I") included heating the material to a temperature 30° F. below the beta transus of the alloy for one hour followed by air cooling to room temperature, and then heating the sample to 1100° F. for eight hours followed by air cooling to room temperature. Heat treatment method II ("HT II") included heating the material to 45° F. below the beta transus of the alloy for one hour followed by air cooling to room temperature, and then heating the sample to 1100° F. for eight hours followed by air cooling to room temperature. One of the two heat treatment methods was applied to each alloy sample except for Alloy 4. In this regard, Alloy 4 was heat treated in accordance with AMS standard 4981 (Revision F). Heat treatment method I, as it pertains to Alloy 4, included heating the sample to 1650° F. for one hour followed by air cooling to room temperature, and then heating to 1100° F. for eight hours followed by air cooling to room temperature. Heat treatment method II, as it pertains to Alloy 4, included heating the sample to 1600° F. for one hour followed by air cooling, and then heating to 1100° F. for eight hours followed by air cooling to room temperature. Various physical properties of the six experimental alloys were measured, including tensile properties, creep deformation, and fatigue properties, as shown below.

Tensile Properties Evaluation

Hot forged plate samples of Alloys 1-6 were hot rolled down to a final gauge of 0.6 inches for tensile testing. The final gauge plates were cut in the longitudinal direction into tensile blanks (0.6 inch×0.6 inch×4.0 inch), and then heat treated according to HT I or HT II (described above). The tensile properties were measured at room temperature (75° F.), and at elevated temperatures (800° F. and 900° F.). Room temperature tensile properties were measured in the longitudinal direction, and in accordance with ASTM E8-15a. Elevated temperature tensile properties were measured in the longitudinal direction, and in accordance with ASTM E21-09. The results of the tensile testing are provided in Tables 4a and 4b, below.

TABLE 4a

Tensile Testing Results - Heat Treatment Method I ("HT I")

| Alloy No. | Temperature (° F.) | UTS (ksi) | TYS (ksi) | Elong. (%) | Reduction in Area (%) |
|---|---|---|---|---|---|
| 1 (Inv.) | 75 | 177.4 | 157.3 | 11.5 | 18.0 |
| 1 (Inv.) | 800 | 140.4 | 110.2 | 13.5 | 27.0 |
| 1 (Inv.) | 900 | 137.2 | 106.6 | 15.0 | 30.0 |
| 2 (Non-Inv.) | 75 | 191.8 | 175.0 | 10.0 | 23.0 |
| 2 (Non-Inv.) | 800 | 149.0 | 122.8 | 13.0 | 35.5 |
| 2 (Non-Inv.) | 900 | 148.7 | 119.6 | 14.0 | 36.5 |
| 3 (Non-Inv.) | 75 | 159.1 | 144.7 | 16.0 | 29.0 |
| 3 (Non-Inv.) | 800 | 114.1 | 88.9 | 17.0 | 42.0 |
| 3 (Non-Inv.) | 900 | 115.5 | 88.9 | 18.5 | 47.0 |
| 4 (Non-Inv.) | 75 | 188.2 | 175.4 | 9.9 | 18.0 |
| 4 (Non-Inv.) | 800 | 141.9 | 115.9 | 12.0 | 40.0 |
| 4 (Non-Inv.) | 900 | 137.3 | 109.3 | 19.5 | 64.0 |

TABLE 4b

Tensile Testing Results - Heat Treatment Method II ("HT II")

| Alloy No. | Temperature (° F.) | UTS (ksi) | TYS (ksi) | Elong. (%) | Reduction in Area (%) |
|---|---|---|---|---|---|
| 1 (Inv.) | 75 | 180.4 | 160.8 | 11.5 | 19.0 |
| 1 (Inv.) | 800 | 135.9 | 108.5 | 12.0 | 33.0 |
| 1 (Inv.) | 900 | 135.0 | 105.7 | 16.5 | 33.0 |
| 2 (Inv.) | 75 | 192.4 | 177.5 | 10.0 | 25.0 |
| 2 (Inv.) | 800 | 159.4 | 131.3 | 11.0 | 26.5 |
| 2 (Inv.) | 900 | 144.8 | 119.3 | 16.0 | 52.0 |
| 3 (Non-Inv.) | 75 | 156.0 | 142.9 | 17.0 | 28.0 |
| 3 (Non-Inv.) | 800 | 114.6 | 90.8 | 18.5 | 44.0 |
| 3 (Non-Inv.) | 900 | 110.8 | 87.1 | 19.5 | 46.0 |
| 4 (Non-Inv.) | 75 | 181.2 | 166.8 | 10.3 | 21.0 |
| 4 (Non-Inv.) | 800 | 146.2 | 119.5 | 12.5 | 39.0 |
| 4 (Non-Inv.) | 900 | 140.6 | 110.8 | 17.0 | 50.0 |
| 5 (Non-Inv.) | 75 | 171.6 | 153.2 | 12.0 | 19.0 |
| 5 (Non-Inv.) | 800 | 130.3 | 106.4 | 17.0 | 45.0 |
| 5 (Non-Inv.) | 900 | 122.8 | 99.7 | 21.0 | 60.0 |
| 6 (Non-Inv.) | 75 | 160.0 | 145.7 | 14.0 | 33.0 |
| 6 (Non-Inv.) | 800 | 121.6 | 95.6 | 15.0 | 33.0 |
| 6 (Non-Inv.) | 900 | 121.6 | 92.8 | 17.0 | 37.0 |

As shown in Tables 4a-4b, Alloy 2 (HT I) realizes a superior TYS and UTS at elevated temperature, relative to Alloy 3 and Alloy 4. At elevated temperatures, Alloy 1 (HT I) realizes similar strength to Alloy 4, and superior strength to Alloy 3. Similarly, Alloy 2 (HT II) realizes superior strength at elevated temperature relative to Alloys 3, 4, 5, and 6. Alloy 1 (HT II) realizes lower strength than Alloy 4 at elevated temperature, but is superior to Alloys 3, 5, and 6. At elevated temperatures, the inventive alloys realize acceptable ductility (e.g., about 10% and higher) for both heat treatment methods.

Creep Evaluation

Hot forged plate samples of Alloys 1-6 were hot rolled down to a final gauge of 0.6 inch, and were then cut in the longitudinal direction into blanks (0.6 inch×0.6 inch×4.0 inch). The blanks were then heat treated according to one of the two heat treatment methods ("HT I" and "HT II") prior to the creep deformation evaluation. The creep was evaluated in accordance with ASTM E139-11. The creep deformation was evaluated under two elevated temperature conditions: (1) 800° F. at a stress of 95 ksi and (2) 950° F. at a stress of 35 ksi. The results of the creep deformation evaluation are shown in Tables 5a-5b, below.

TABLE 5a

Creep Evaluation Results for 800° F. at a stress of 95 ksi

| Alloy No. | Heat Treatment | Time (hrs) | Creep Deformation (%) |
|---|---|---|---|
| 1 (Inv.) | HT I | 35 | 0.097 |
| 1 (Inv.) | HT I | 100 | 0.144 |
| 1 (Inv.) | HT II | 35 | 0.105 |
| 1 (Inv.) | HT II | 100 | 0.158 |
| 2 (Inv.) | HT I | 35 | 0.134 |
| 2 (Inv.) | HT I | 100 | 0.193 |
| 2 (Inv.) | HT II | 35 | 0.096 |
| 2 (Inv.) | HT II | 100 | 0.179 |
| 3 (Non-Inv.) | HT I | 35 | 0.124 |
| 3 (Non-Inv.) | HT I | 100 | 0.194 |
| 3 (Non-Inv.) | HT II | 35 | 0.128 |
| 3 (Non-Inv.) | HT II | 100 | 0.210 |
| 4 (Non-Inv.) | HT I | 35 | 0.241 |
| 4 (Non-Inv.) | HT I | 100 | 0.353 |
| 4 (Non-Inv.) | HT II | 35 | 0.356 |
| 4 (Non-Inv.) | HT II | 100 | 0.542 |

TABLE 5a-continued

Creep Evaluation Results for 800° F. at a stress of 95 ksi

| Alloy No. | Heat Treatment | Time (hrs) | Creep Deformation (%) |
|---|---|---|---|
| 5 (Non-Inv.) | HT II | 35 | 0.436 |
| 5 (Non-Inv.) | HT II | 100 | 0.662 |
| 6 (Non-Inv.) | HT II | 35 | 0.332 |
| 6 (Non-Inv.) | HT II | 100 | 0.478 |

TABLE 5b

Creep Evaluation Results for 950° F. at a stress of 35 ksi

| Alloy No. | Heat Treatment | Time (hrs) | Creep Deformation (%) |
|---|---|---|---|
| 1 (Inv.) | HT I | 35 | 0.059 |
| 1 (Inv.) | HT I | 100 | 0.074 |
| 1 (Inv.) | HT II | 35 | 0.083 |
| 1 (Inv.) | HT II | 100 | 0.097 |
| 2 (Inv.) | HT I | 35 | 0.058 |
| 2 (Inv.) | HT I | 100 | 0.091 |
| 2 (Inv.) | HT II | 35 | 0.080 |
| 2 (Inv.) | HT II | 100 | 0.120 |
| 3 (Non-Inv.) | HT I | 35 | 0.077 |
| 3 (Non-Inv.) | HT I | 100 | 0.106 |
| 3 (Non-Inv.) | HT II | 35 | 0.069 |
| 3 (Non-Inv.) | HT II | 100 | 0.112 |
| 4 (Non-Inv.) | HT I | 35 | 0.415 |
| 4 (Non-Inv.) | HT I | 100 | 0.638 |
| 4 (Non-Inv.) | HT II | 35 | 0.363 |
| 4 (Non-Inv.) | HT II | 100 | 0.589 |
| 5 (Non-Inv.) | HT II | 35 | 0.327 |
| 5 (Non-Inv.) | HT II | 100 | 0.581 |
| 6 (Non-Inv.) | HT II | 35 | 0.162 |
| 6 (Non-Inv.) | HT II | 100 | 0.237 |

The creep evaluation results are further illustrated in FIGS. 2a-2d. As illustrated, inventive alloys 1 and 2, having been heat treated by either HT I or HT II, realize superior creep deformation relative to Alloys 4, 5, and 6, and realize roughly the same creep deformation relative to Alloy 3.

DWELL FATIGUE EVALUATION

Hot forged plate samples of Alloys 1-6 were cut in the longitudinal direction into blanks (1.0 inch×1.0 inch×5 inch). The blanks were then heat treated according to HT II. The room temperature dwell fatigue and low cycle fatigue measurements were performed at a maximum fatigue stress equivalent to 95% of the alloy's room temperature yield strength. For dwell fatigue life (DFL) measurements, a wave form cycle of 1 s-1 s-120 s-1 s (where s=seconds) was used. For the low-cycle fatigue life (LCFL) measurements, a cycle of 1 s-1 s (where s=seconds) was used. Dwell fatigue and low cycle fatigue measurements were made in accordance with ASTM E466-15. The results of the dwell fatigue life and low cycle fatigue life measurements are given in Table 6, below. The ratios of low cycle fatigue life to dwell fatigue life ("dwell fatigue life debit") are also given in Table 6, below.

TABLE 6

Dwell Fatigue Evaluation Results

| Alloy No. | Fatigue Stress (ksi) | Dwell fatigue life (No. of cycles) | Low cycle fatigue life (No. of cycles) | Dwell fatigue life debit |
|---|---|---|---|---|
| 1 (Inv.) | 150.0 | 8329 | 19937 | 2.39 |
| 2 (Inv.) | 171.0 | 9631 | 19948 | 2.07 |
| 3 (Non-Inv.) | 132.5 | 4836 | 20543 | 4.25 |
| 4 (Non-Inv.) | 160.0 | 8467 | 14338 | 1.69 |
| 5 (Non-Inv.) | 137.5 | 9131 | 25949 | 2.84 |
| 6 (Non-Inv.) | 135.9 | 2196 | 30299 | 13.80 |

Figure 3A:
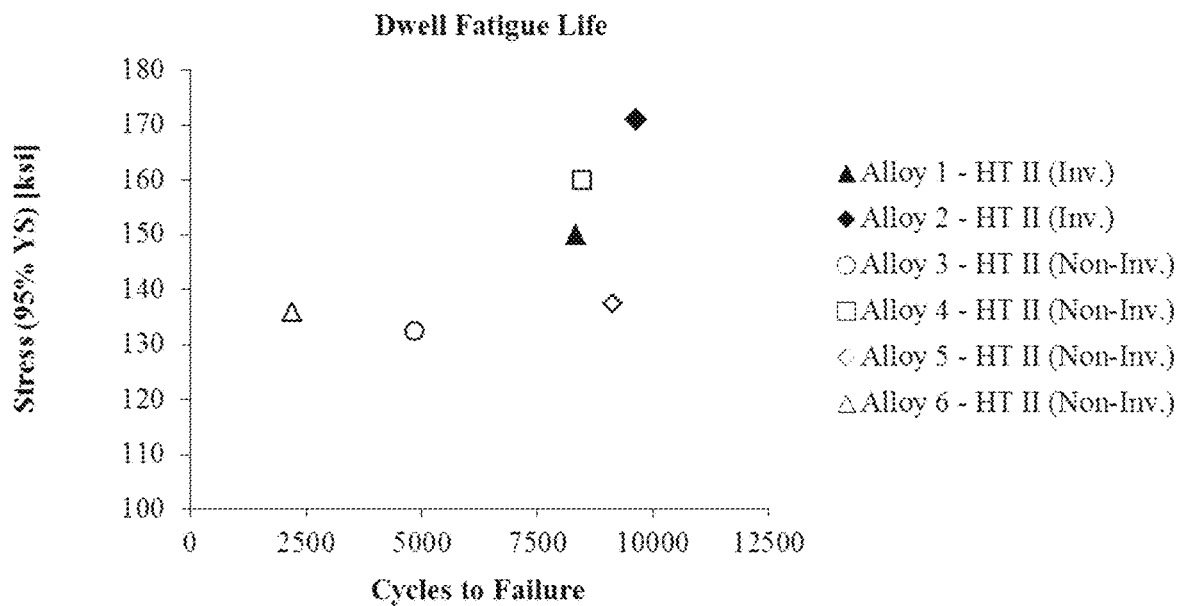
FIG. 3a gives the dwell fatigue life at 95% of the room temperature yield strength for Alloys 1-6 having been heat treated in accordance with HT II.
Figure 3B:
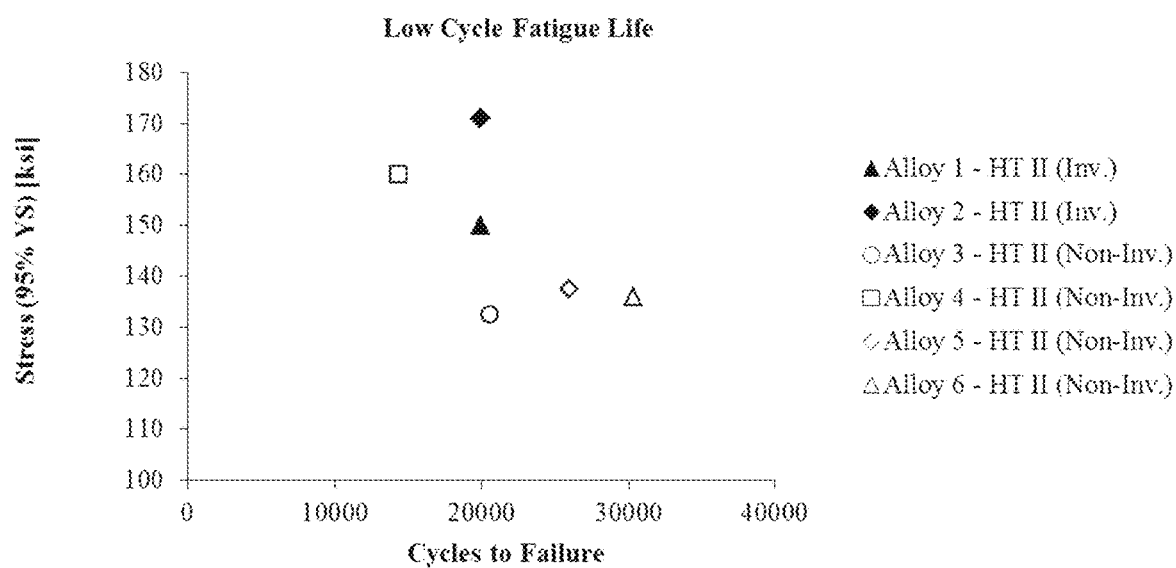
FIG. 3b gives the low cycle fatigue life at 95% of the room temperature yield strength for Alloys 1-6 having been heat treated in accordance with HT II.
Figure 3C:
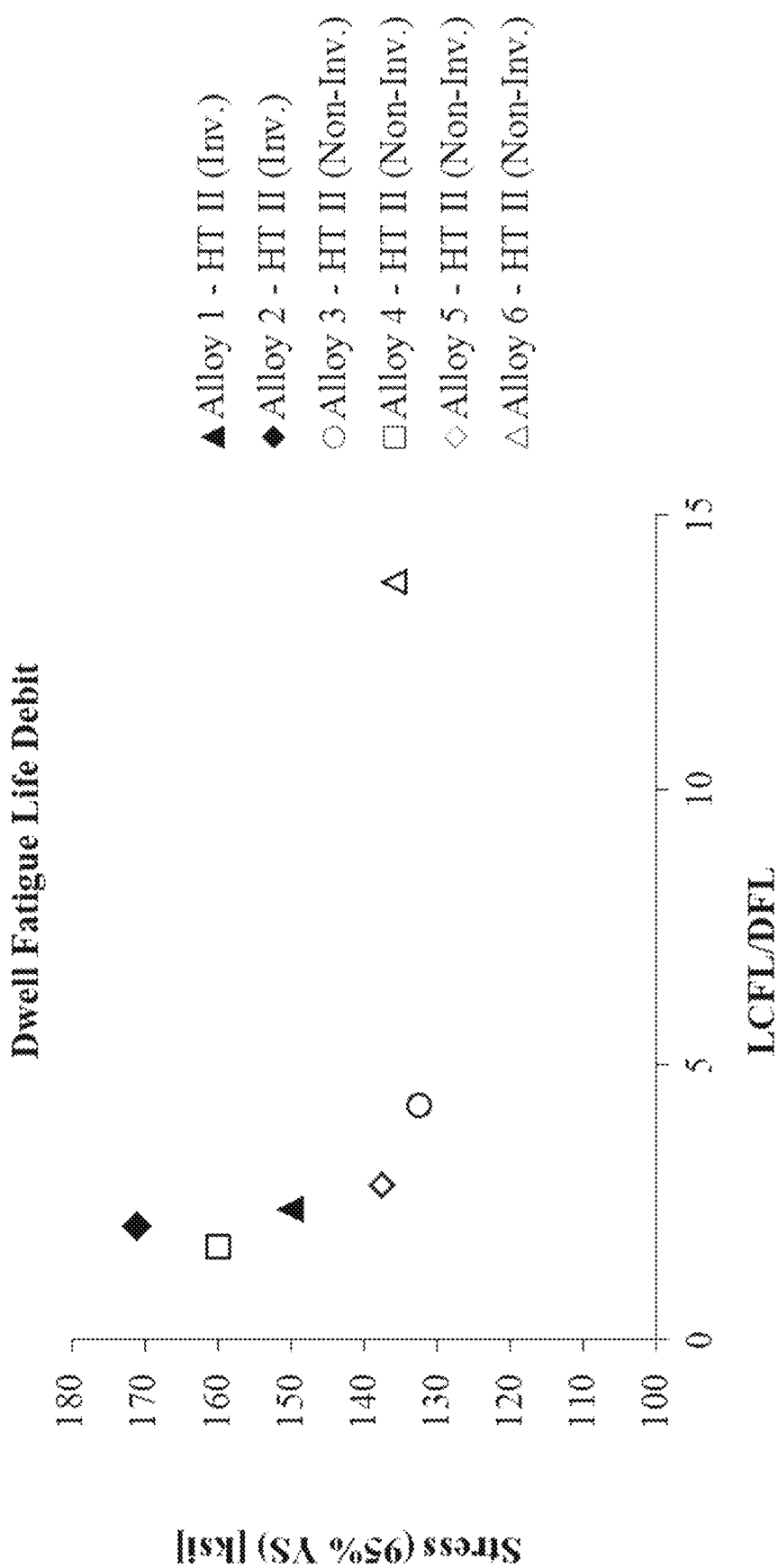
FIG. 3c gives the dwell fatigue life debit (ratio of low cycle fatigue life to dwell fatigue life) at 95% of the room temperature yield strength for Alloys 1-6 having been heat treated in accordance with HT II.

As illustrated in FIGS. 3a-3c, inventive Alloy 2 realizes a superior yield strength and dwell fatigue life over the other alloys. Inventive Alloy 1 realizes a similar dwell fatigue life when compared to non-inventive Alloys 4 and 5. Inventive Alloys 1 and 2 realize a lower low cycle fatigue life than non-inventive alloys 5 and 6, a similar low cycle fatigue life to Alloy 3, and a superior low cycle fatigue life relative to Alloy 4. The ratio of the low cycle fatigue life to the dwell fatigue life (e.g., the dwell fatigue life debit) is illustrated in FIG. 3c.

The higher the dwell fatigue life debit, the greater likelihood of a titanium alloy product failing due to dwell fatigue-initiated failure mechanisms. In this regard, inventive Alloys 1 and 2 realize a lower dwell fatigue life debit than non-inventive Alloys 3, 5 and 6. The lower dwell fatigue life debit indicates that inventive Alloys 1 and 2 may realize a lower likelihood of dwell fatigue-initiated failure. Furthermore, the dwell fatigue life and low cycle fatigue life measurements were performed at a maximum fatigue stress corresponding to 95% of the alloy's room temperature yield strength. In this regard, Alloy 2 realizes a superior dwell fatigue strength (i.e., 95% of room temperature yield strength) when compared to the other alloys, and Alloy 1 realizes a higher dwell fatigue strength when compared to non-inventive Alloys 3, 5, and 6.

Figure 5C:
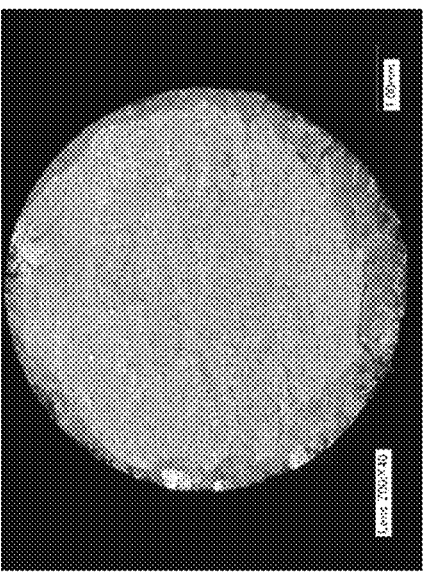
FIG. 5c is an optical micrograph of the dwell fatigue fracture surface for Alloy 4.
Figure 5B:
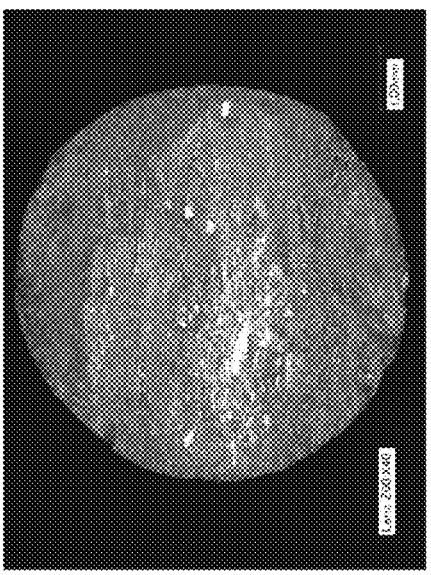
FIG. 5b is an optical micrograph of the dwell fatigue fracture surface for Alloy 3.
Figure 5A:
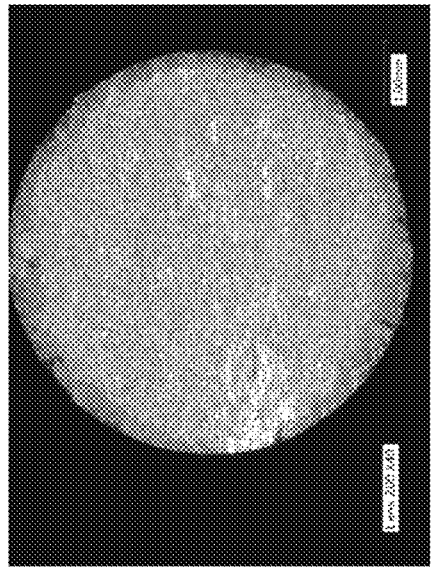
FIG. 5a is an optical micrograph of the dwell fatigue fracture surface for Alloy 1.

Samples of Alloy 1, 3, and 4 that reached failure during the dwell fatigue evaluation were prepared for micrograph analysis of the fracture surfaces by etching the sample with acid. Fracture surface electron micrographs are given in FIGS. 4a-4c. Fracture surface optical micrographs are given in FIGS. 5a-5c.

Figure 6B:
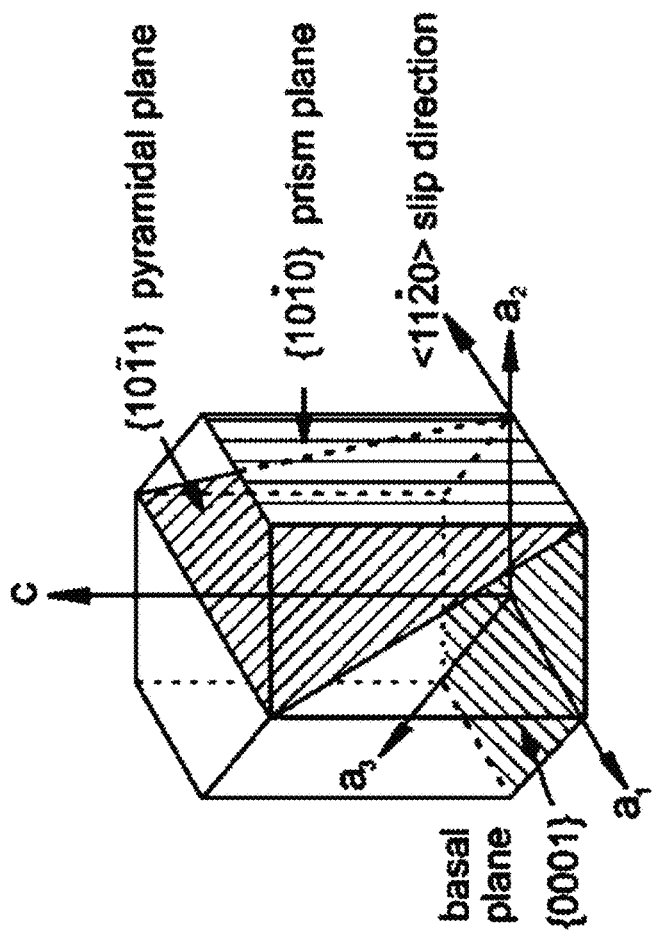
FIG. 6b is a schematic of dislocation systems within the alpha (hexagonal-close packed) phase.
Figure 6A:
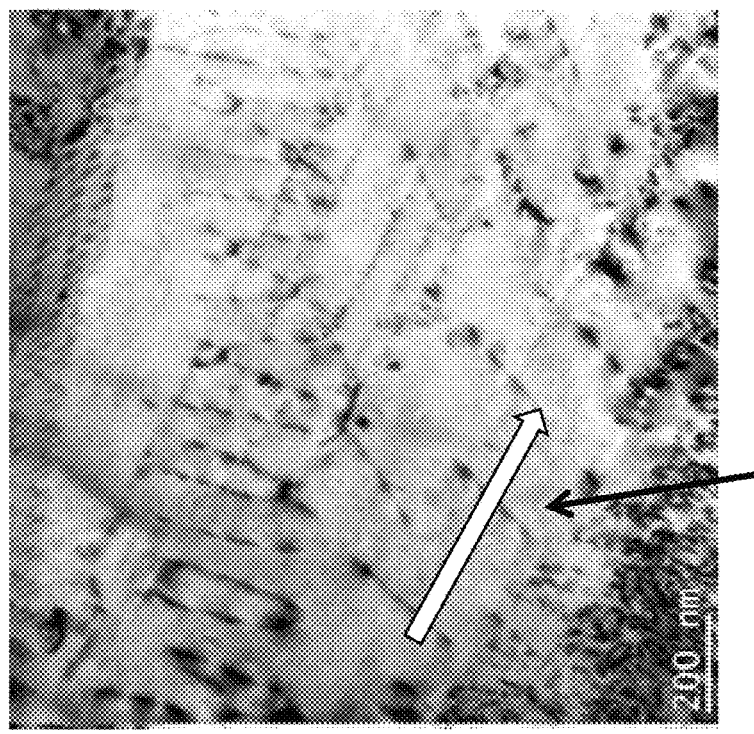
FIG. 6a is an electron micrograph of the dwell fatigue fracture surface that illustrates the dislocation systems of Alloy 1.

For Alloy 1, the dislocation systems were analyzed using the electron micrograph given in FIG. 6a. In this regard, it was determined that multiple non-basal dislocation systems were activated in Alloy 1 during the dwell fatigue evaluation. For instance, the pyramidal and prism plane dislocation slips were found to be activated during the dwell fatigue evaluation, as illustrated in FIG. 6a. In this regard, FIG. 6b illustrates the hexagonal close-packed (alpha phase) unit cell structure and three dislocation slip systems, (1) the basal plane, (2) the prism plane, and (3) the pyramidal plane. As illustrated, Alloy 1 realized multiple activated dislocation slip systems that may contribute to improving the fatigue properties.

As illustrated in Tables 4a-6 and FIGS. 2a-3c, the inventive alloys realize a good combination of properties relative to the non-invention alloys. For instance, non-invention Alloy 3 and invention Alloys 1 and 2 realize similar creep deformation, but non-inventive Alloy 3 realizes poor strength and a poor dwell fatigue life. Non-invention Alloy 4 and invention Alloys 1 and 2 realize similar dwell fatigue life and strength properties, but Alloy 4 realizes poor creep deformation. Non-inventive Alloy 5 and inventive Alloys 1 and 2 realize a similar dwell fatigue life, but Alloy 5 realizes poor creep deformation. Lastly, non-inventive Alloy 6 and inventive Alloys 1 and 2 realize similar creep deformation, but Alloy 6 realizes a poor dwell fatigue life. Thus, the new inventive alloys (Alloy 1 and 2) realize a superior combination of properties over the non-inventive alloys (Alloys 3-6).

Example 2

The niobium content of Alloy 1 from Example 1 was varied to produce three new alloys, Alloys 1-A through 1-C. The creep deformation and tensile properties of the new alloys 1-A through 1-C were evaluated. The target compositions of the new example alloys are given in Table 7, below. Other than the alloying elements (Nb, Al, Sn, Zr, and Mo), incidental elements (Si), titanium (Ti) and impurities formed the balance of each alloy composition.

TABLE 7

Target Compositions of Example 2 Alloys

| Alloy No. | Nb | Al | Sn | Zr | Mo | Si |
|---|---|---|---|---|---|---|
| 1-A (Inv.) | 8.4 | 6.0 | 3.0 | 3.0 | 0.5 | 0.3 |
| 1-B (Inv.) | 7.6 | 6.0 | 3.0 | 3.0 | 0.5 | 0.3 |
| 1-C (Non-Inv.) | 5.9 | 6.0 | 3.0 | 3.0 | 0.5 | 0.3 |

The three new alloys were cast as ingot (6 inches diameter) and then hot forged down to 1.0 in by 7.0 in by L (length) long plates. The hot forged plate samples were hot rolled down to a final gauge of 0.6 inches inch, and were then cut in the longitudinal direction into tensile blanks (0.6 inch×0.6 inch×4.0 inch) for elevated temperature (900° F.) tensile testing. The tensile blanks were then heat treated according to HT II, described above in Example 1. Elevated temperature (900° F.) tensile properties were measured twice for each alloy in the longitudinal direction, and in accordance with ASTM E21-09. The averages of the measurements are shown in Table 8, below. Tensile testing results for Alloy 1 from Example 1 are also given in Table 8 for comparison. The tensile testing results are further illustrated in FIG. 7a.

TABLE 8

Effect of Nb on Elevated Temperature (900° F.) Tensile Testing

| Alloy No | Nb (wt. %) | TYS (ksi) | UTS (ksi) | El. % | Reduction in Area % |
|---|---|---|---|---|---|
| 1-HT I (Inv) | 8.0 | 107 | 137 | 15.0 | 30.0 |
| 1-HT II (Inv.) | 8.0 | 106 | 135 | 16.5 | 33.0 |
| 1-A-HT II (Inv.) | 8.4 | 100 | 126 | 17.5 | 52.5 |
| 1-B-HT II (Inv.) | 7.6 | 106 | 135 | 16.5 | 33.3 |
| 1-C-HT II (Non-Inv.) | 5.9 | 93 | 120 | 16.5 | 41.8 |

Hot forged plate samples of the three alloys were then hot rolled down to for creep evaluation. The hot forged plates were hot rolled down to a final gauge of 0.6 inches inch, and were then cut in blanks (0.6 inch×0.6 inch×4.0 inch) for creep deformation evaluation. The blanks were heat treated according to heat treatment method HT II, described above in Example 1. The creep deformation was evaluated at 950° F. at a stress of 35 ksi, for 100 hours in accordance with ASTM E139-11, the results of which are given in Table 9, below. Creep deformation results for Alloy 1 from Example 1 are also given in Table 9 for comparison. The creep deformation results are further illustrated in FIG. 7b.

TABLE 9

Elevated Temperature Creep Evaluation of Alloys 1-A through 1-C

| Alloy No | Nb (wt. %) | Creep Deformation (%) |
|---|---|---|
| 1-HT I (Inv) | 8.0 | 0.074 |
| 1-HT II (Inv.) | 8.0 | 0.097 |
| 1-A-HT II (Inv.) | 8.4 | 0.118 |
| 1-B-HT II (Inv.) | 7.6 | 0.096 |
| 1-C-HT II (Non-Inv.) | 5.9 | 0.237 |

Figure 7A:
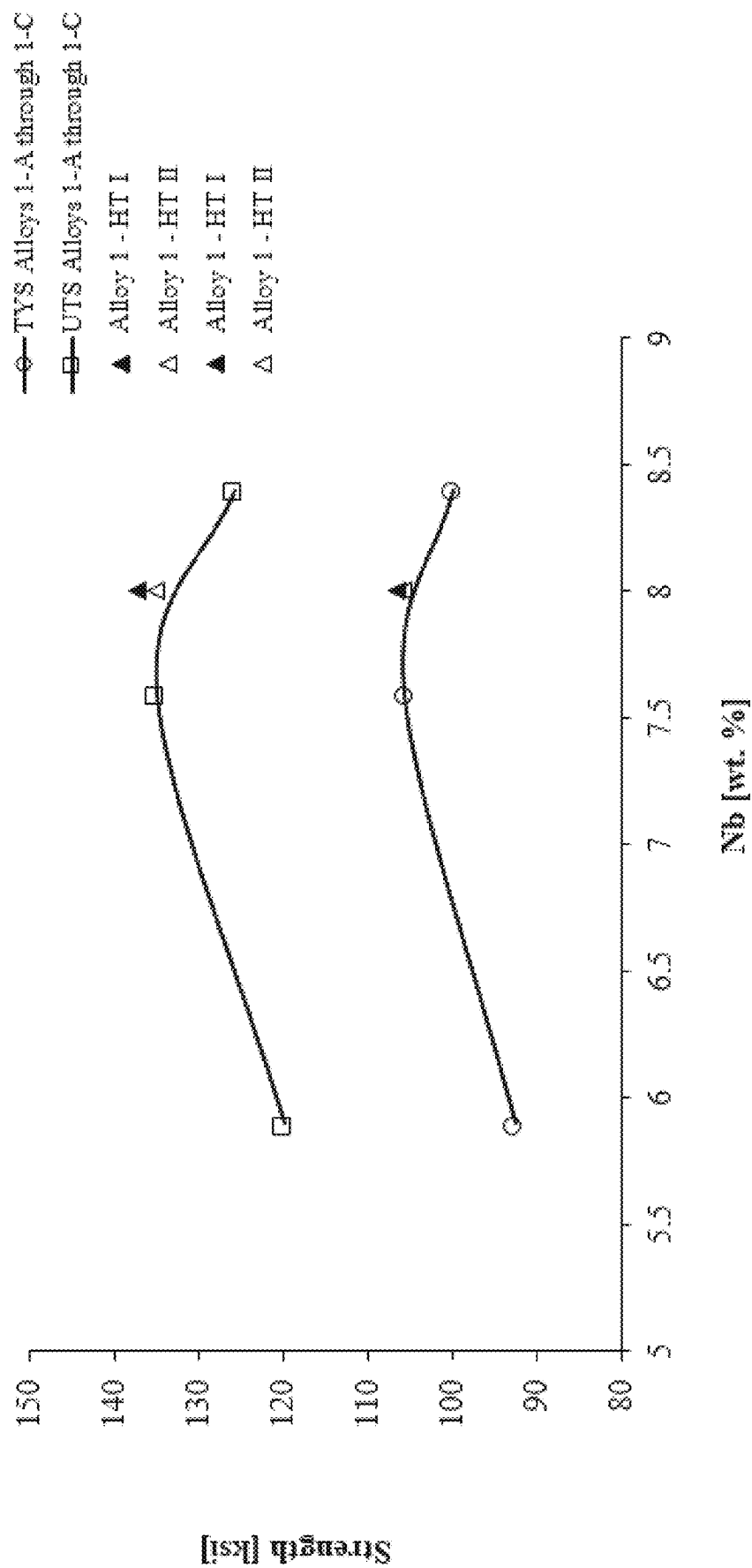
FIG. 7a gives the tensile yield strength and ultimate tensile strength for Alloys 1-A through 1-C at 900° F. as a function of niobium.
Figure 7B:
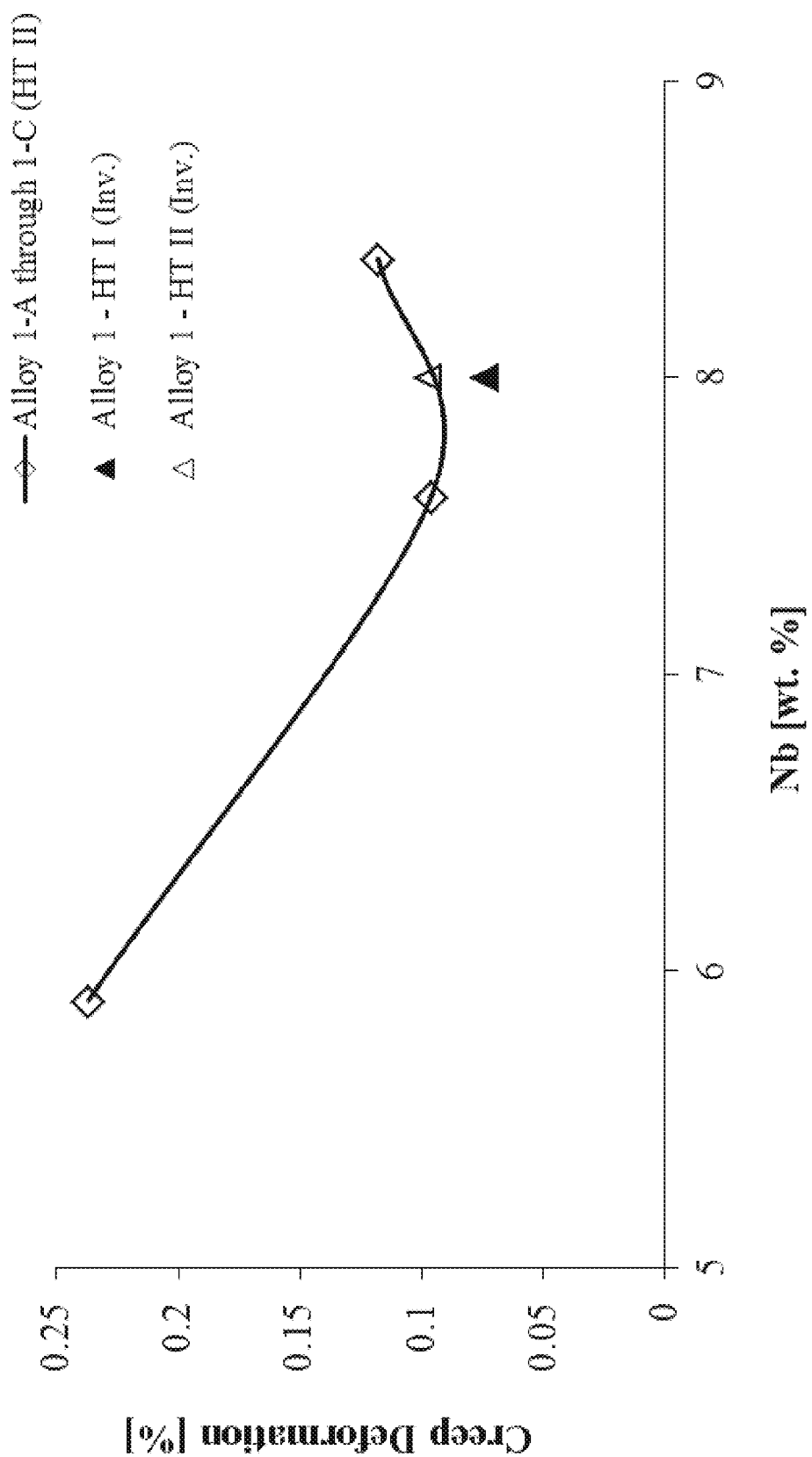
FIG. 7b gives the creep deformation at 100 hours for Alloys 1-A through 1-C at 950° F. and a stress of 35 ksi as a function of niobium.

As illustrated in FIG. 7b, the creep deformation decreases from about 6 to about 7.5 wt. % niobium (Nb), and then increases from 7.5 wt. % niobium (Nb) to about 8.5 wt. % niobium (Nb). As illustrated in FIG. 7a, the strength properties increase from about 6 to about 7.5 wt. % niobium (Nb), and decrease from 7.5 wt. % niobium (Nb) to about 8.5 wt. % niobium (Nb). Thus, an appropriate amount of niobium (e.g., 6.5-8.5 wt. %) may facilitate a good combination of properties, including at least the strength and creep resistance.

While a number of embodiments of the present invention have been described, it is understood that these embodiments are illustrative only, and not restrictive, and that many modifications may become apparent to those of ordinary skill in the art. Further still, unless the context clearly requires otherwise, the various steps may be carried out in any desired order, and any applicable steps may be added and/or eliminated.

What is claimed is:

1. A titanium alloy comprising:
   4.75-6.75 wt. % Al;
   6.75-8.5 wt. % (Nb+Ta);
      wherein the titanium alloy includes at least 6.75 wt. % Nb;
   1.5-3.5 wt. % Sn;
   2.0 to 3.5 wt. % Zr; and
   up to 2.5 wt. % Mo;
   the balance being titanium, optional incidental elements, and impurities.

2. The titanium alloy of claim 1, wherein the titanium alloy includes at least 5.1% Al.

3. The titanium alloy of claim 1, wherein the titanium alloy includes at least 2.5 wt. % Zr.

4. The titanium alloy of claim 3, wherein (wt. % Sn)+(wt. % Zr) is at least 4.0.

5. The titanium alloy of claim 1, wherein the titanium alloy includes at least 0.1 wt. % Mo.

6. The titanium alloy of claim 5, wherein (wt. % Nb+Ta)+ (wt. % Mo) is at least 7.25.

7. The titanium alloy of claim 1, wherein the titanium alloy includes at least 1.75 wt. % Mo.

8. The titanium alloy of claim 1, wherein the titanium alloy includes at least 2.0 wt. % Sn.

9. The titanium alloy of claim 1, wherein the titanium alloy includes not greater than 8.25 wt. % (Nb+Ta).

10. The titanium alloy of claim 1, wherein the titanium alloy includes at least 7.0 wt. % (Nb+Ta).

11. The titanium alloy of claim 1, wherein the titanium alloy includes tantalum as an impurity.

12. The titanium alloy of claim 1, wherein the optional incidental elements include:
   up to 0.6 wt. % Si;
   up to 0.20 wt. % O; and
   up to 0.10 wt. % C.

13. The titanium alloy of claim 12, wherein the titanium alloy includes at least 0.1 wt. % Si, or up to 0.10 wt. % O, or at least 0.01 wt. % C.

14. The titanium alloy of claim 1, wherein the impurities include:
up to 0.1 wt. % Fe;
up to 0.1 wt. % Ni;
up to 0.3 wt. % Cu; and
up to 0.3 wt. % Cr.

15. The titanium alloy of claim 1, wherein the titanium alloy is in the form of a wrought product, wherein the wrought product is a rolled product, an extruded product or a forged product.

16. The titanium alloy of claim 1, wherein the titanium alloy is a shape casting.

17. The titanium alloy of claim 1, wherein the titanium alloy is an additive manufacturing feedstock, wherein the additive manufacturing feedstock is one of a powder and a wire.

18. The titanium alloy of claim 1, wherein the titanium alloy is an automotive component or an aerospace component.

19. The titanium alloy of claim 1, wherein the titanium alloy includes at least 3.0 wt. % Zr.

20. A titanium alloy comprising:
4.75-6.75 wt. % Al;
6.75-8.5 wt. % (Nb+Ta);
    wherein the titanium alloy includes at least 6.75 wt. % Nb;
1.5-3.5 wt. % Sn;
up to 5.0 wt. % Zr; and
1.75 to 2.5 wt. % Mo;
the balance being titanium, optional incidental elements, and impurities.

21. The titanium alloy of claim 20, wherein the titanium alloy includes at least 5.1% Al.

22. The titanium alloy of claim 20, wherein (wt. % Sn)+(wt. % Zr) is at least 4.0.

23. The titanium alloy of claim 20, wherein the titanium alloy includes at least 2.0 wt. % Sn.

24. The titanium alloy of claim 20, wherein the titanium alloy includes not greater than 8.25 wt. % (Nb+Ta).

25. The titanium alloy of claim 20, wherein the titanium alloy includes at least 7.0 wt. % (Nb+Ta).

26. The titanium alloy of claim 20, wherein the titanium alloy includes tantalum as an impurity.

* * * * *